(12) United States Patent
Bell et al.

(10) Patent No.: US 11,796,754 B2
(45) Date of Patent: Oct. 24, 2023

(54) SYSTEM AND METHOD OF CONTROLLING A STRANDER BY WIRELESS VISUAL MONITORING OF A SUBUNIT REEL

(71) Applicant: CORNING RESEARCH & DEVELOPMENT CORPORATION, Corning, NY (US)

(72) Inventors: Michael Alan Bell, Newton, NC (US); James Franklin Cochran, Lincolnton, NC (US); Donald Kennedy Hall, Mooresville, NC (US); Anthony Ng'oma, Horseheads, NY (US); Jimmy Ray Spurlin, Jr., Hickory, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 412 days.

(21) Appl. No.: 17/199,825

(22) Filed: Mar. 12, 2021

(65) Prior Publication Data
US 2022/0291468 A1     Sep. 15, 2022

(51) Int. Cl.
*G02B 6/44*     (2006.01)
*B65H 49/34*     (2006.01)
(52) U.S. Cl.
CPC ............. *G02B 6/449* (2013.01); *B65H 49/34* (2013.01)
(58) Field of Classification Search
CPC ................................ G02B 6/449; B65H 49/34
See application file for complete search history.

(56) References Cited

U.S. PATENT DOCUMENTS

| | | |
|---|---|---|
| 6,330,787 B1 | 12/2001 | Michnik |
| 6,389,787 B1 | 5/2002 | Greenwood et al. |
| 7,356,983 B2 | 4/2008 | Bieszczad et al. |
| 2007/0095042 A1 | 5/2007 | Bieszczad et al. |
| 2018/0320312 A1 | 11/2018 | Wenzel et al. |
| 2019/0214166 A1 | 7/2019 | Shirai et al. |
| 2019/0308843 A1 | 10/2019 | Coe et al. |
| 2020/0319324 A1 | 10/2020 | Au et al. |

FOREIGN PATENT DOCUMENTS

| | | |
|---|---|---|
| CN | 202008879 U | 10/2011 |
| WO | 93/07330 A1 | 4/1993 |

OTHER PUBLICATIONS

Anton Patyuchenko, "60 GHz Wireless Data Interconnect for Slip Ring Applications", published by Analog Devices, 5 pages.
International Search Report and Written Opinion of the International Searching Authority; PCT/US2022/018632; dated Jun. 24, 2022; 10 pages; US Patent Office.

*Primary Examiner* — Joseph L Williams
(74) *Attorney, Agent, or Firm* — Thomas R. Irwin

(57) ABSTRACT

Disclosed herein is a system and method of controlling a strander by wireless visual monitoring. In certain embodiments, a stranding system includes at least one vision device mounted to a rotating structure of a strander. The at least one vision device is configured to capture a view of at least a portion of a subunit reel of at least one of a set of payoff units of the rotating structure to generate vision data. The stranding system further includes at least one wireless communication module mounted to the rotating structure to receive and wirelessly transmit the vision data over a high-bandwidth data link. The stranding system is configured to proactively identify payout hazards of the subunit package (e.g., cable crossover) to, for example, prevent damage to the strander.

23 Claims, 20 Drawing Sheets

SYSTEM AND METHOD OF CONTROLLING A STRANDER BY WIRELESS VISUAL MONITORING OF A SUBUNIT REEL

BACKGROUND

The present disclosure relates to systems and methods of controlling a strander by wireless visual monitoring of a subunit package of the strander.

Fiber optical systems are used in optical telecommunications to send optical signals from one location to another. Fiber optical systems typically employ an optical fiber cable that defines an optical link that optically connects one piece of optical equipment at one location (i.e., on one side of the optical link) to another piece of optical equipment at another location (i.e., on the other side of the optical link). For example, a transmission path between a server in a data center and a computer at a control center may include one or more optical links. In many cases, the optical fiber cable supports multiple optical fibers over which the optical signals are transmitted and received in both directions using transmitters and receivers (e.g., transceivers) at both ends of the optical link. Fiber optic cables have a number of advantages in waveguide systems compared to bulky traditional conductor cables (e.g., copper). Fiber optic cables provide high bandwidth data transmission, transport multiple signals and traffic types, and/or deliver high-speed Internet access, especially as data rates increase.

To manufacture cables (e.g., fiber optic cables, copper communication cables, power cables, load bearing cables, etc.), a strander may be used to helically twist or strand together a plurality of subunits (e.g., optical subunits, non-optical subunits, etc.). Optical subunits may be any of several unitized structures including one or more fibers. For example a subunit may be an optical ribbon, a buffer tube containing individual optical fibers, a tube containing one or more optical ribbons, a group of fibers or ribbons surrounded by a fibrous binder, a unitized group of fibers or ribbons surrounded by a thin polymeric covering, a unitized group of tight buffered fibers, or a unitized group of any of the forgoing subunits. Non-optical subunits may include electrical conductors, insulated electrical conductors, load bearing elements, etc. Subunits may in some instances further include other cable elements such as, but not limited to, strength members, water blocking elements, tapes, armoring elements and jackets. An entire optical cable may also serve as a subunit for a larger stranded cable.

Twisting and stranding together of optical subunits at an appropriate pitch and/or laylength and within appropriately controlled tension parameters ensures optimum optical transmission performance and product reliability by minimizing stress and strain concentrations on the optical fibers under cable installation and service conditions. To minimize manufacturing cost and maximize stranding line capacity, stranders are operated at a high rotational speeds, but doing so increases the likelihood of process upsets and the impact of such upsets are more likely to result in damage to the fiber optic cable and/or uncontrolled or emergency shutdown of the strander itself resulting in unscheduled and possibly unsellable lengths of cable. Many stranders have low bandwidth copper data links that cross the rotational boundaries of the strander through electrical contact between brushes and slip ring components. Slip rings are high maintenance components and are not a good medium for data transmission, especially high bandwidth data transmission. Unfortunately, such low bandwidth across slip rings has limited options for monitoring, alarming, and/or controlling stranders to mitigate risks of operating stranders at high rotational speeds.

SUMMARY

One embodiment of the disclosure relates to a stranding system, including a strander that includes a first rotating structure. The first rotating structure includes a first chassis mounted to a central axle and configured to rotate around a center axis defined by the central axle. The first rotating structure further includes a first set of payoff units mounted to the first chassis. Each payoff unit of the first set of payoff units includes a cradle mounted to the first chassis. Each payoff unit of the first set of payoff units further includes a subunit package rotatably mounted to the cradle. The subunit package includes a subunit reel configured to rotate relative to the cradle. The subunit package further includes a subunit wrapped around the subunit reel. The stranding system further includes at least one first vision device mounted to the first rotating structure. The at least one first vision device is configured to capture a first view of at least a portion of the subunit package of at least one of the first set of payoff units to generate first vision data. The stranding system further includes at least one first wireless communication module mounted to the first rotating structure. The at least one wireless communication module is configured to receive and wirelessly transmit the first vision data.

An additional embodiment of the disclosure relates to a method including capturing, by at least one first vision device, a first view of at least a portion of a subunit package of at least one of a first set of payoff units of a first rotating structure of a strander while a subunit reel of the subunit package of the at least one of the first set of payoff units rotates relative to a cradle of one of the first set of payoff units mounted to a first chassis, the first chassis rotates around a center axis defined by a central axle of the strander. The method further includes generating, by the at least one first vision device, first vision data based on the first view. The method further includes receiving, by at least one first wireless communication module mounted to the first rotating structure, the first vision data. The method further includes wirelessly transmitting, by the at least one first wireless communication module, the first vision data.

An additional embodiment of the disclosure relates to a system including a rotating structure. The rotating structure includes a primary unit configured to rotate around a center axis. The rotating structure further includes at least one secondary unit mounted to the primary unit. The system further includes at least one vision device mounted to the rotating structure, the at least one vision device configured to capture a view of at least a portion of the at least one secondary unit to generate vision data. The system further includes at least one wireless communication module mounted to the rotating structure, the at least one wireless communication module configured to receive and wirelessly transmit the vision data.

Additional features and advantages will be set out in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1A:
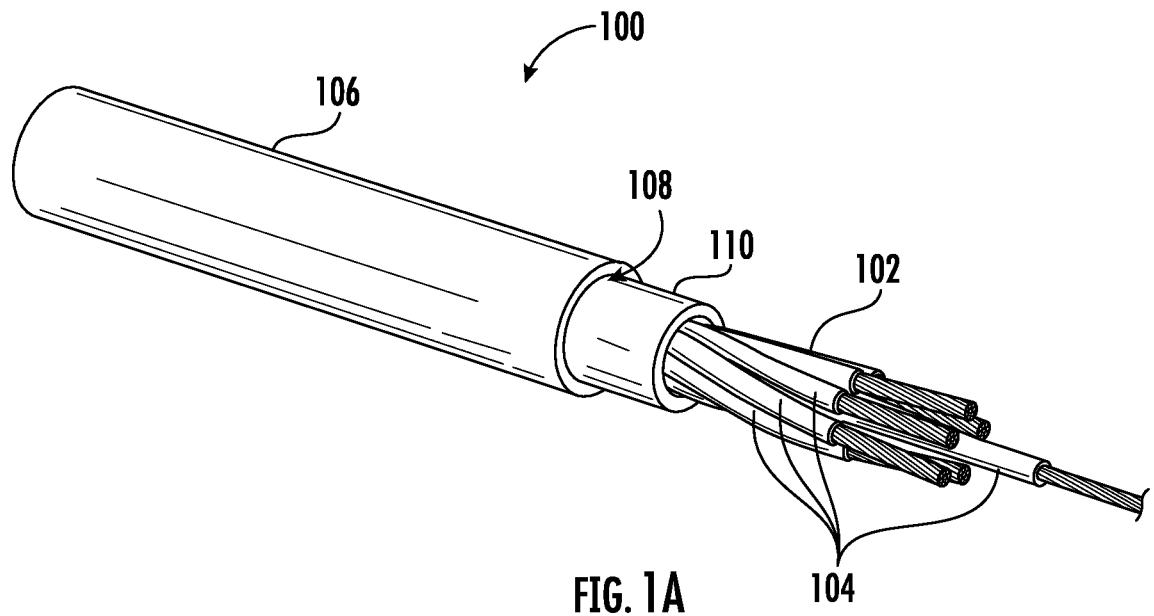
FIG. 1A is a perspective view of a section of fiber optic distribution cable.

Reference will now be made in detail to the presently preferred embodiments, examples of which are illustrated in the accompanying drawings. Whenever possible, the same reference numerals will be used throughout the drawings to refer to the same or like parts.

The embodiments set out below represent the information to enable those skilled in the art to practice the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Reference Numerals and Terminology

The use herein of ordinals in conjunction with an element is solely for distinguishing what might otherwise be similar or identical labels, such as "first layer" and "second layer," and does not imply a priority, a type, an importance, or other attributes, unless otherwise stated herein.

The term "about" used herein in conjunction with a numeric value means any value that is within a range of ten percent greater than or ten percent less than the numeric value.

As used herein, the articles "a" and "an" in reference to an element refers to "one or more" of the element unless otherwise explicitly specified. The word "or" as used herein is inclusive unless contextually impossible. For example, the recitation of A or B means A, or B, or both A and B.

The phrase "surface" as used herein refers to an outermost portion of an item and includes a thickness of the outermost portion of the item. The precise thickness is generally not relevant to the embodiments unless otherwise discussed herein. For example, a layer of material has a surface that includes the outermost portion of the layer of material as well as some depth into the layer of material, and the depth may be relatively shallow or may extend substantially into the layer of material.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

The use herein of "proximate" means at, next to, or near.

The terms "left," "right," "top," "bottom," "front," "back," "horizontal," "parallel," "perpendicular," "vertical," "lateral," "coplanar," and similar terms are used for convenience of describing the attached figures and are not intended to limit this disclosure. For example, the terms "left side" and "right side" are used with specific reference to the drawings as illustrated, and the embodiments may be in other orientations in use. Further, as used herein, the terms "horizontal," "parallel," "perpendicular," "vertical," "lateral," etc., include slight variations that may be present in working examples.

As used herein, the terms "optical communication," "in optical communication," and the like mean that two elements are arranged such that optical signals are passively or actively transmittable therebetween via a medium, such as but not limited to, an optical fiber, connectors, free space, index-matching structure or gel, reflective surface, or other light directing or transmitting means.

As used herein, the term "vision device" refers to photo or video capture in any wavelength (e.g., visible, ultraviolet (UV), infrared, etc.). In other words, vision device refers to photo, video, or other spectroscopic imaging techniques resolvable to a bitstream (e.g., interferometry, light diffraction techniques, lidar, etc.).

As used herein, the term "light" refers to electromagnetic radiation (e.g., visible, UV, infrared, etc.).

As used herein, the term "illumination" refers to subjecting an object to electromagnetic radiation (e.g., visible, UV, infrared, etc.).

Data Centers and Fiber Optic Cable Assemblies

Figure 1B:
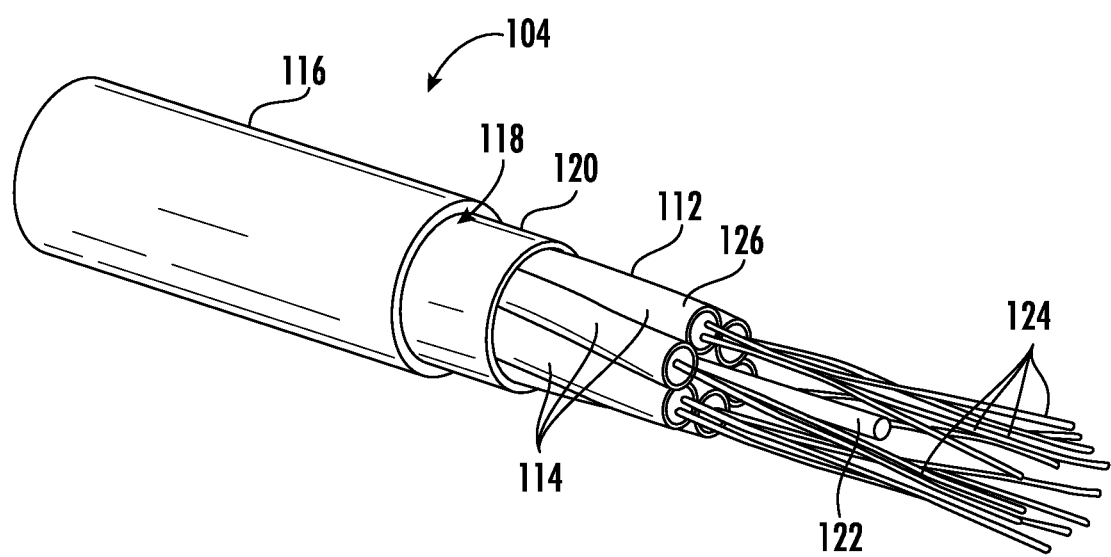
FIG. 1B is a perspective view of a section of a subunit of the distribution cable of FIG. 1A.

FIGS. 1A-1B are views of a section of a fiber optic distribution cable 100, in accordance with aspects of the present disclosure. Referring to FIG. 1A, the distribution cable 100 includes a cable bundle 102 (may also be referred to herein as a cable core) of a plurality of subunits 104 (e.g., optical subunits, subunit cables, etc.) and a distribution jacket 106 (may also be referred to as outer jacket, etc.), defining a distribution interior 108. The cable bundle 102 of the subunits 104 is disposed in the distribution interior 108 of the distribution jacket 106.

In certain embodiments, a strain-relief component 110 may be disposed within the distribution interior 108 of the distribution jacket 106 between the cable bundle 102 of the subunits 104 and the distribution jacket 106. The strain-relief component 110 surrounds and/or is interspersed among the cable bundle 102 of the subunits 104.

In certain embodiments, an outer layer of a plurality of subunits 104 is stranded around an inner layer of subunits 104 to provide higher fiber densities. This reduces any stress or strain concentrations on any single subunit 104 (e.g., from bending of the distribution cable 100). In certain embodiments, a central strength element (not shown) may be provided, and the subunits 104 may be stranded around the central strength element. In yet other cable applications, stranding may not be used and the subunits 104 may run substantially parallel through the distribution cable 100.

Referring to FIG. 1B, each subunit 104 (may also be referred to herein as a micro module, etc.) includes a subunit bundle 112 (may also be referred to herein as a subunit core) of a plurality of tether cables 114 (may also be referred to herein as tether subunits) and a subunit jacket 116 defining a subunit interior 118. The subunit bundle 112 of the tether cable 114 is disposed in the subunit interior 118 of the subunit jacket 116.

In certain embodiments, a strain-relief component 120 may be disposed within the subunit interior 118 of the subunit jacket 116 between the subunit bundle 112 of the tether cables 114 and the subunit jacket 116. The strain-relief component 120 surrounds and/or is interspersed among the subunit bundle 112 of the subunits 104. In certain embodiments, the strain-relief component 120 may be, for example, a layer of longitudinally-extending yarns for absorbing tensile loads on the subunit bundle 112. In certain embodiments, the strain-relief component 120 includes a dispersed layer of aramid strands in the region between the subunit jacket 116 and the subunit bundle 112 of tether cables 114.

In certain embodiments, a central strength element 122 may be disposed in a center of the subunit bundle 112, and thereby, within the subunit interior 118 of the subunit jacket 116. The tether cables 114 may be stranded (e.g., helically twisted) around the central strength element 122. In certain embodiments, an outer layer of a plurality of tether cables 114 is stranded around an inner layer of tether cables 114 to provide higher fiber densities. In yet other cable applications, stranding may not be used and the tether cables 114 may run substantially parallel through the subunit 104. The central strength element 122 provides strain-relief and absorbs loads from the tether cables 114.

In certain embodiments, as illustrated, the subunit bundle 112 is stranded such that the tether cables 114 are helically twisted around a longitudinal axis of the subunit bundle 112. This reduces any stress or strain concentrations on any one tether cable 114 (e.g., from bending of the distribution cable 100 (see FIG. 1) and/or subunit 104). Each tether cable 114 includes one or more optical fibers 124 (may also be referred to herein as optical fiber waveguides).

In certain embodiments, the strain-relief component 110 and/or strain-relief component 120 may utilize tensile yarns as tension relief elements that provide tensile strength to the cables 100, 104, 114. In certain embodiments, a preferred material for the tensile yarns is aramid (e.g., KEVLAR®), but other tensile strength materials could be used, such as high molecular weight polyethylenes (e.g., SPECTRA® fiber and DYNEEMA® fiber, Teijin Twaron® aramids, fiberglass, etc.).

Figure 2A:
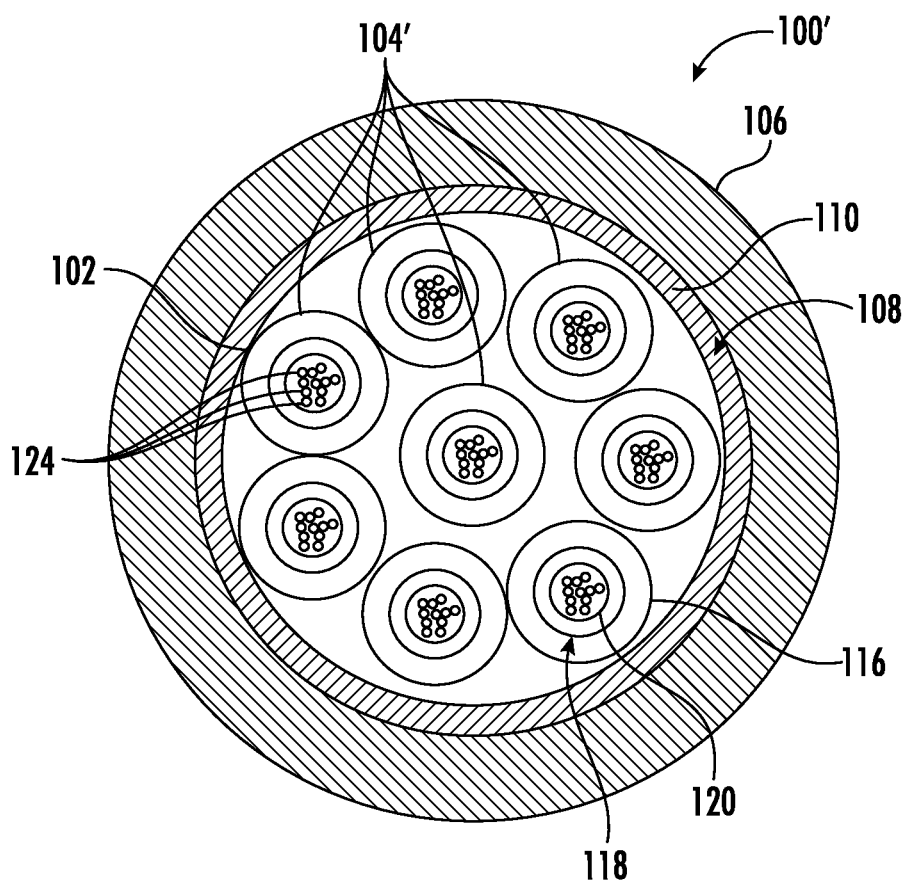
FIG. 2A is a cross-section view of an embodiment of the distribution cable of FIGS. 1A-1B.
Figure 2B:
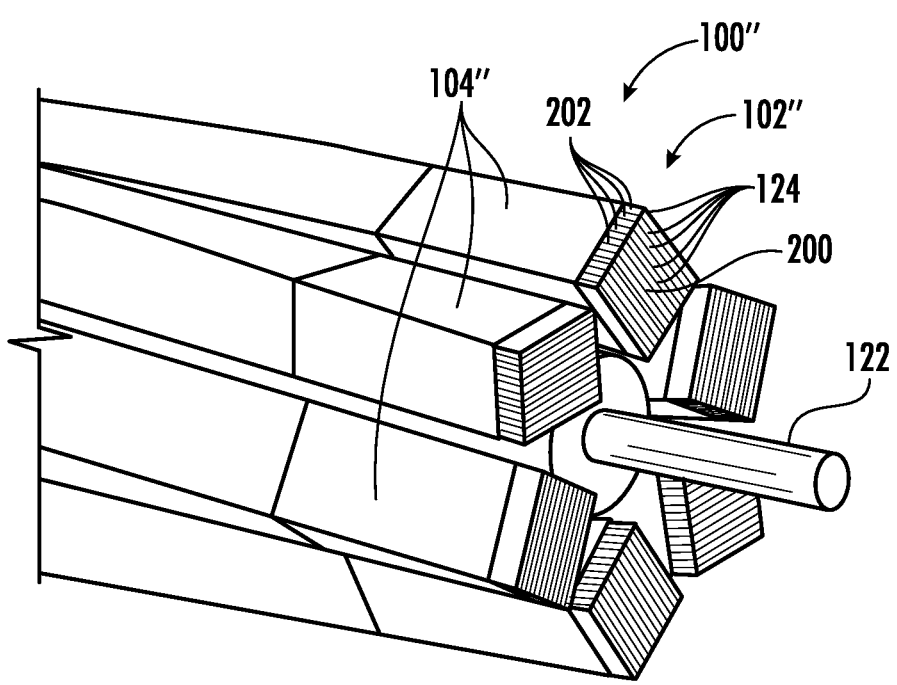
FIG. 2B is a perspective view of another embodiment of the distribution cable of FIGS. 1A-1B.
Figure 2C:
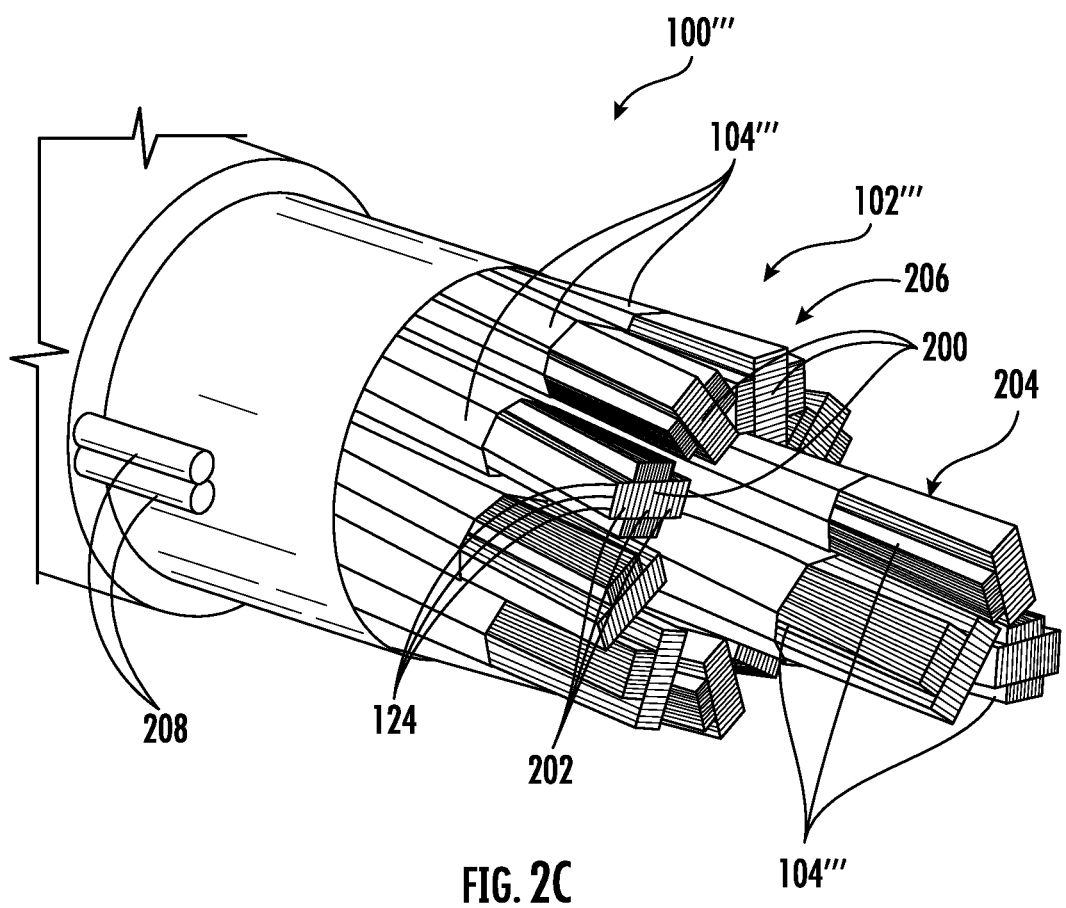
FIG. 2C is a perspective view of another embodiment of the distribution cable of FIGS. 1A-1B.

FIG. 2A is a cross-sectional view of an embodiment of the distribution cable 100' of FIGS. 1A-1B, in accordance with aspects of the present disclosure. Each of the subunits 104' includes optical fibers 124 loosely disposed within the subunit 104' (e.g., in an essentially parallel array). The subunit 104' may be further encased in an interlocking armor for enhanced crush resistance. FIG. 2B is a perspective view of another embodiment of the distribution cable 100". Each of the subunits 104" of the cable bundle 102" is a stack 200 of fiber ribbons 202. Each fiber ribbon 202 includes a plurality of optical fibers 124. FIG. 2C is a perspective view of another embodiment of the distribution cable 100'''. Including a first layer 204 of stranded subunits 104''' surrounded by a second layer 206 of stranded subunits 104". Each of the subunits 104''' of the cable bundle 102''' is a stack 200 of fiber ribbons 202. Of course, more layers may be used. The subunit jacket 116 includes outboard strength members 208 extending axially through subunit jacket 116.

These cable designs include a plurality of subunits 104, 104', 104", 104''' (referred to generally as subunits 104) brought together and aligned into a longitudinal cable bundle 102, 102', 102", 102''' (referred to generally as cable bundle 102) to form a cable core prior to application of an exterior jacket 116 or binder. The subunits 104 (e.g., ribbons, buffer tubes, optical subunits, etc.) forming the core be either twisted together and placed at the centerline of the cable (e.g., central stack ribbon designs) or helically stranded about a central member, such as a GRP (glass reinforced plastics) strength member (e.g., stranded tube designs). Some designs incorporate both stranding concepts where multiple subunits 104 are stranded about a central member, and each of the subunits 104 contain a stack of twisted ribbons (e.g., Corning Altos Ribbon cable). So-called "slotted core ribbon" designs (not shown) bring together multiple ribbons into several ribbon stacks where each ribbon stack is stranded into an assigned helical slot or groove of a profile extruded central member prior to jacketing. These cable designs require a strander to bring together and orient the optical elements in the required configuration. Other stranded cable designs include tight buffered fibers helically stranded to form the core of a cable and larger tight buffered cables formed by standing together smaller tight buffered cables.

Figure 3A:
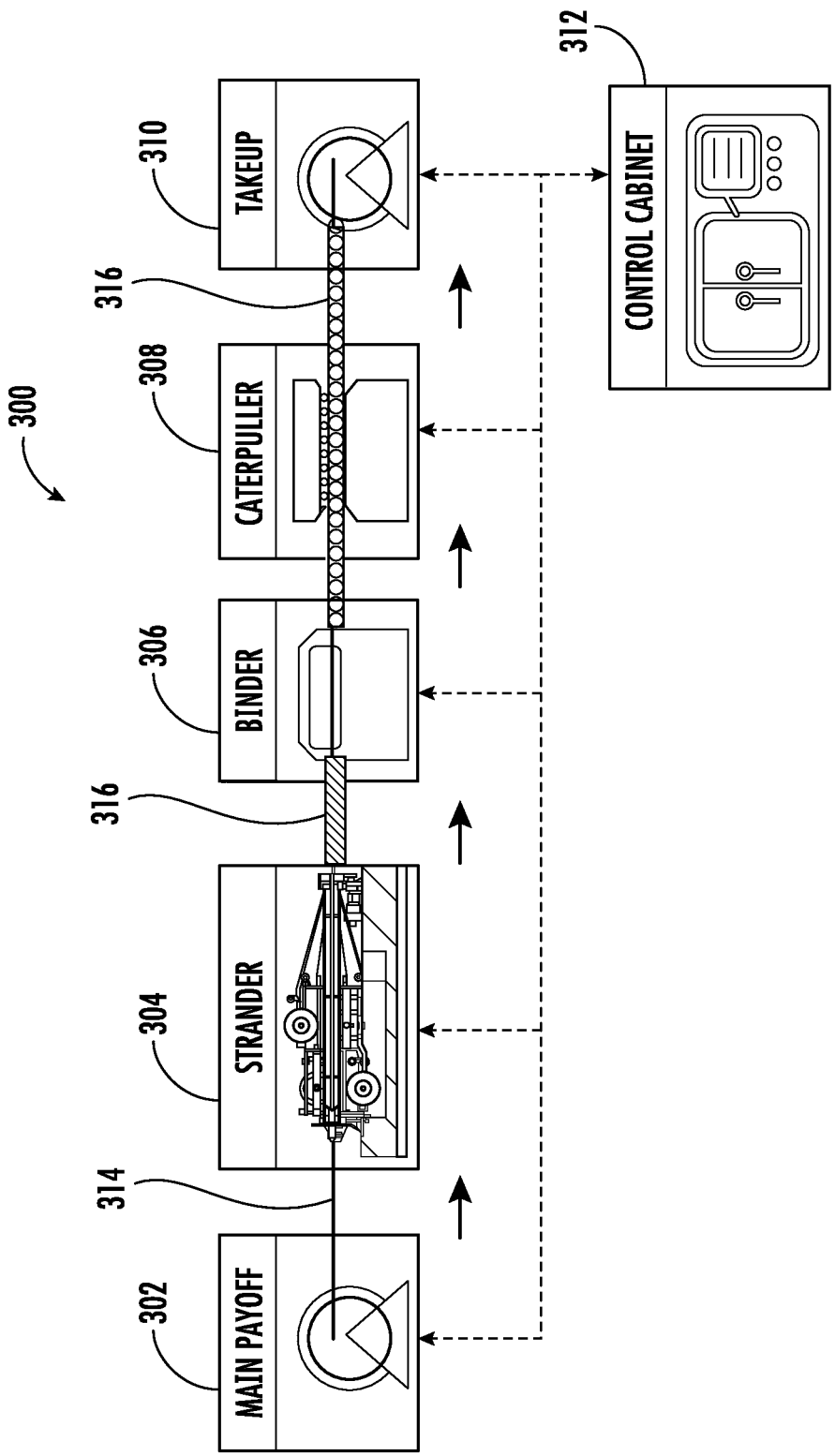
FIG. 3A is a schematic diagram illustrating a stranding system.

FIG. 3A is a diagram illustrating a stranding system 300 (may also be referred to as a stranding line), such as may be used with a rigid stranding line or planetary stranding line. The stranding system 300 includes main payoff 302 (may also be referred to as a central unit payoff), strander 304 (may also be referred to as a helical strander), binder 306 (may also be referred to as binding equipment), caterpuller 308 (may also be referred to as a caterpuller capstan), takeup 310 (may also be referred to as a core takeup, takeup equipment, or takeup reel), control cabinet 312 (may include operator/human-machine interface (HMI)).

The main payoff 302 feeds (i.e., pays off) a central member 314 (may also be referred to as a core, core member, etc.) from a storage reel into the strander 304. In certain embodiments, the central member 314 includes a strength member or a previously stranded cable bundle (i.e., subunit bundle, subunit cable bundle, stranded inner core). Two commonly used types of helical stranders 304 are rigid stranders and planetary stranders. Rigid stranders are useful for central stack cable designs and for the stranding of subunits about a central member 314, where twisting of the subunit during payoff is acceptable. For a rigid strander, each payoff unit of a set of payoff units is configured not to rotate relative to a chassis. Planetary stranders are typically used for cable designs where optical elements are helically stranded about a central member 314 without twisting of the subunits during payoff. For a planetary strander, each payoff unit of a set of payoff units is configured to rotate relative to a chassis. Planetary stranders, unlike rigid stranders, counter-rotate while paying off a subunit 104.

The stranded core 316 from the strander 304 enters a binder 306, which typically winds two binder threads in opposite helical directions from one another at a tight pitch relative to the pitch of the stranded core 316. This binds the stranded subunits together to prevent them from unwinding later. In certain embodiments, additional equipment may be used to apply various other elements such as water block tapes or flame-retardant tapes to the core after the stranded core 316 exits the strander 304 and before the stranded core 316 enters the binder 306. After binding, the bound core 318 enters a traction device known as a caterpuller capstan 308, which provides a pulling force on the bound core 318. The caterpuller capstan 308 governs the overall line speed and conveys the bound core 318 to the core takeup equipment 310, which winds the core onto a storage reel. In certain embodiments, the caterpuller capstan 308 is positioned before the binder 306. The process controller for the stranding line is in a control cabinet 312, which is typically close to the operator interface.

Figure 3B:
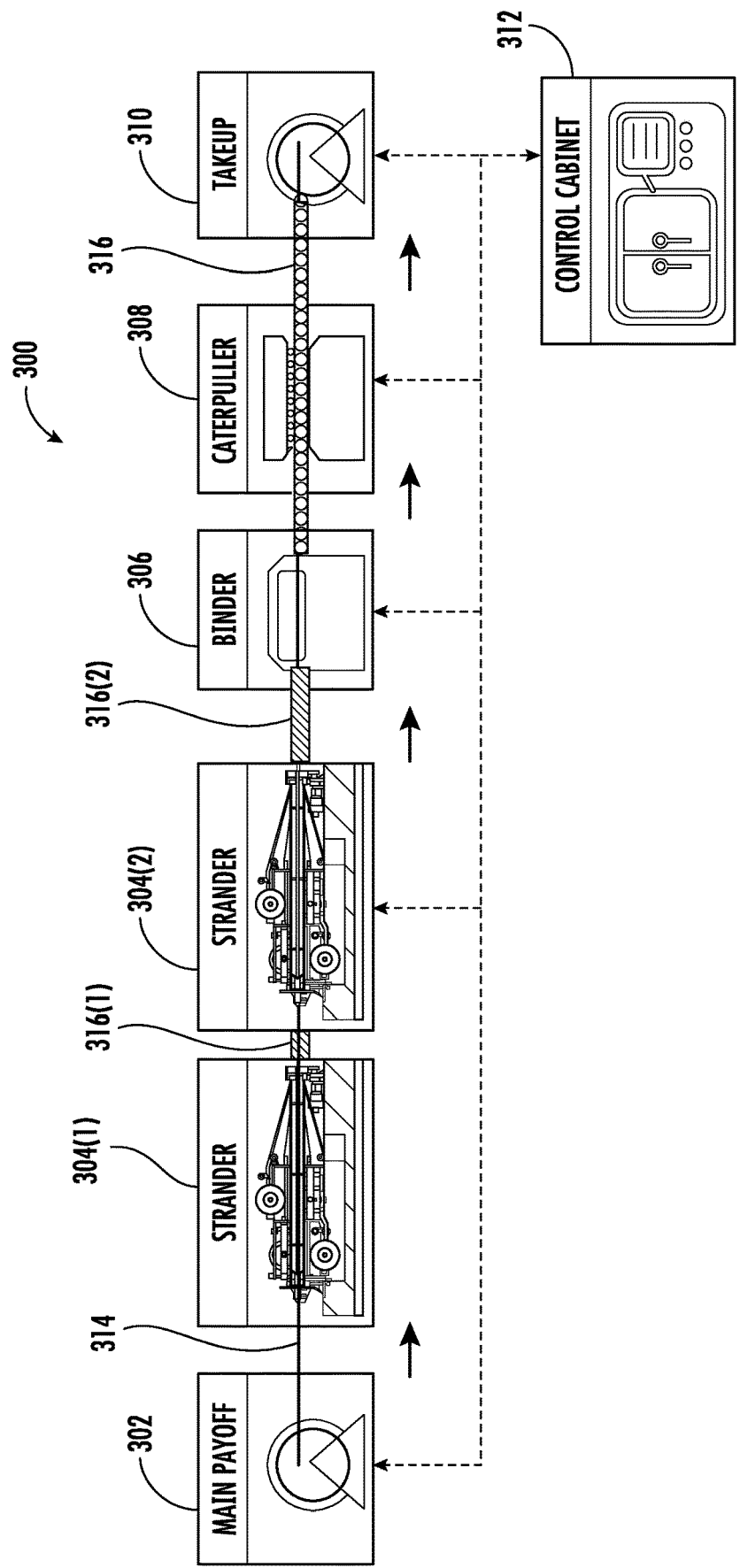
FIG. 3B is a schematic diagram illustrating a stranding system with two stranders operating in tandem.

FIG. 3B is a schematic diagram illustrating a stranding system with two stranders operating in tandem. Some stranding lines 300 may use a tandem arrangement of two stranders 304 wherein the first strander 304 strands a first layer of subunits 104 and the resulting strand is fed into a second strander 304 for stranding a second layer of subunits 104 about the first layer. Some stranding lines may be flexibly configured so as to include certain equipment units which can be enabled or disabled according to the requirements of the product being made.

For example, the first strander 304(1) feeds a stranded core 316(1) into a second strander 304(2) to strand a second layer 316(2) around the stranded core 316(1). In this way, multiple stranders 304 may be used in series. The stranders 304 may be the same type or different types. For example, the first strander 304(1) may be a rigid strander and the second strander 304(2) may be a planetary strander. In certain embodiments, each strander 304 may include one or more of the features discussed in more detail below.

Figure 4A:
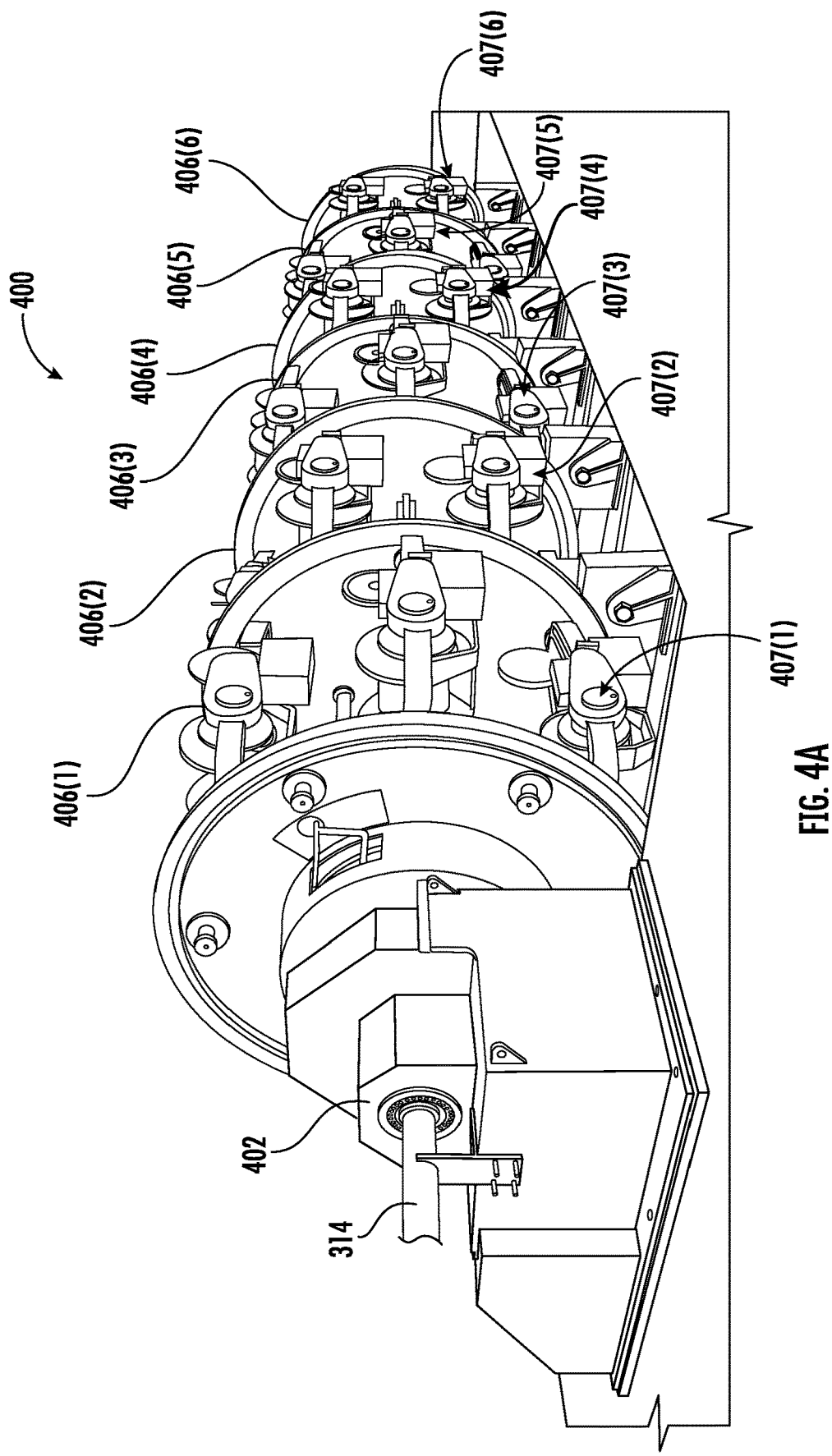
FIG. 4A is a front perspective view of a planetary strander of the stranding systems of FIGS. 3A-3B.
Figure 4B:
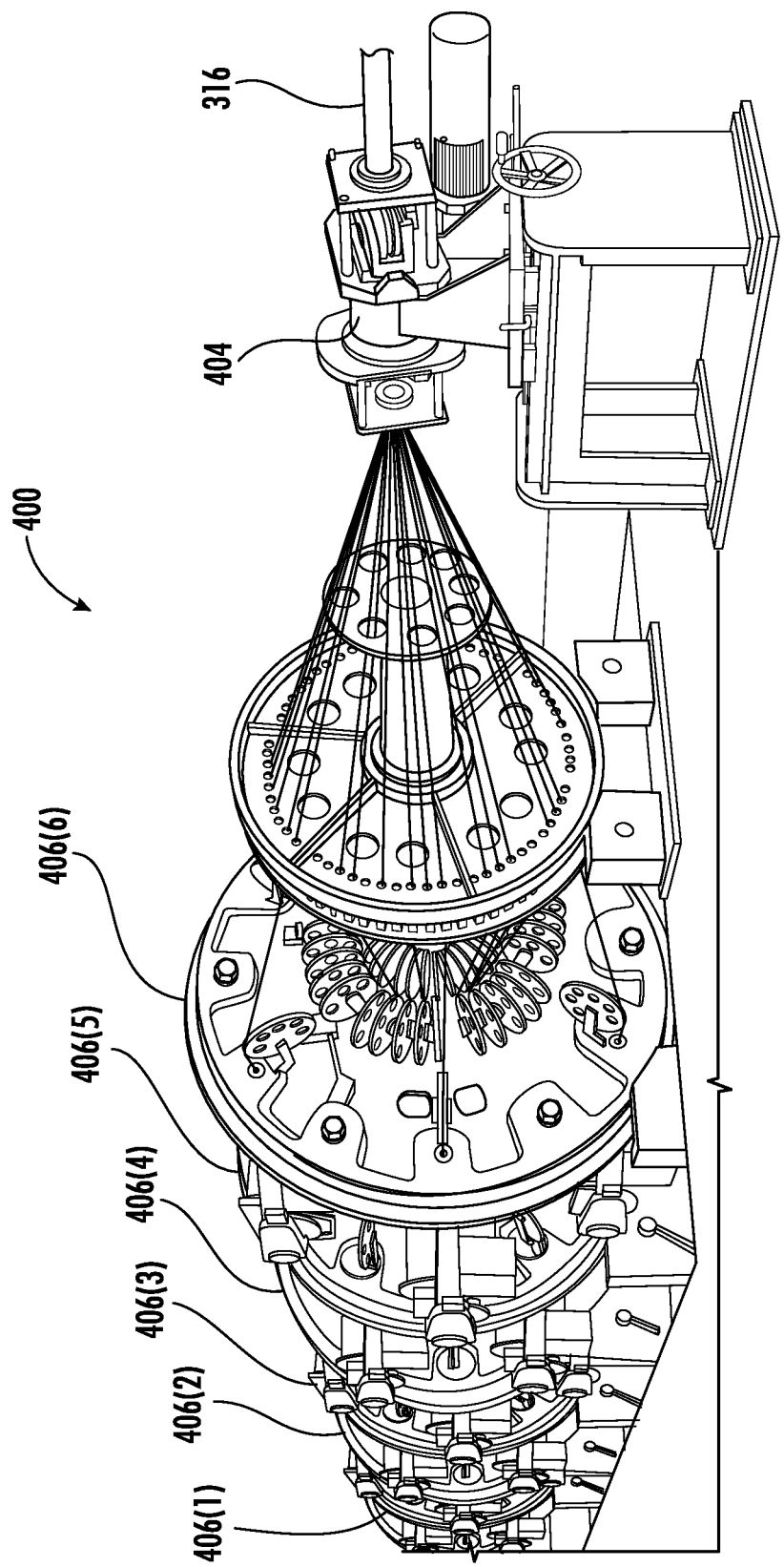
FIG. 4B is a back perspective view of the strander of FIG. 4A.

FIGS. 4A-4D are views of a planetary strander 400. Referring to FIGS. 4A-4B, the planetary strander 400 includes a front hollow-core bearing assembly 402, a rear hollow-core bearing assembly 404, and one or more rotating structures 406(1)-406(6) (referred to generally as rotating structure 406) positioned therebetween. More or fewer rotating structures may be used. In certain embodiments, the planetary strander 400 includes only one rotating structure 406.

The strength member 314 enters at the rotational centerline of the strander 304 through the front hollow-core bearing assembly 402 (which may include a slip ring). Each of the rotating structures includes a set 407(1)-407(6) of payoff units 408. As the strander 400 rotates, the subunits 104 are helically stranded about the central member forming a stranded core. The stranded core 316 exits the strander 400 through another hollow-core bearing assembly 404.

The planetary stander 400 controls payoff of subunits 104 (e.g., optical subunits) to rotating structures 406 of the strander 400, among other features. In particular, in certain embodiments, the strander 400 collects, aligns, and/or orients the subunits 104 into either a twisted or helically stranded configuration to form the cable core prior to binding or jacketing. The strander 400 presents the formed cable core to the next downline process element, typically either a core binder 306, an extrusion crosshead, or a takeup reel 310 (e.g., for storage of the cable core prior to subsequent jacketing on another line). Thus, the strander 400 passes the core across the strander's plane of rotation and along the axis of rotation. The strander 400 delivers drive power across a rotational boundary 502(1) defined by the plane of rotation.

Figure 4C:
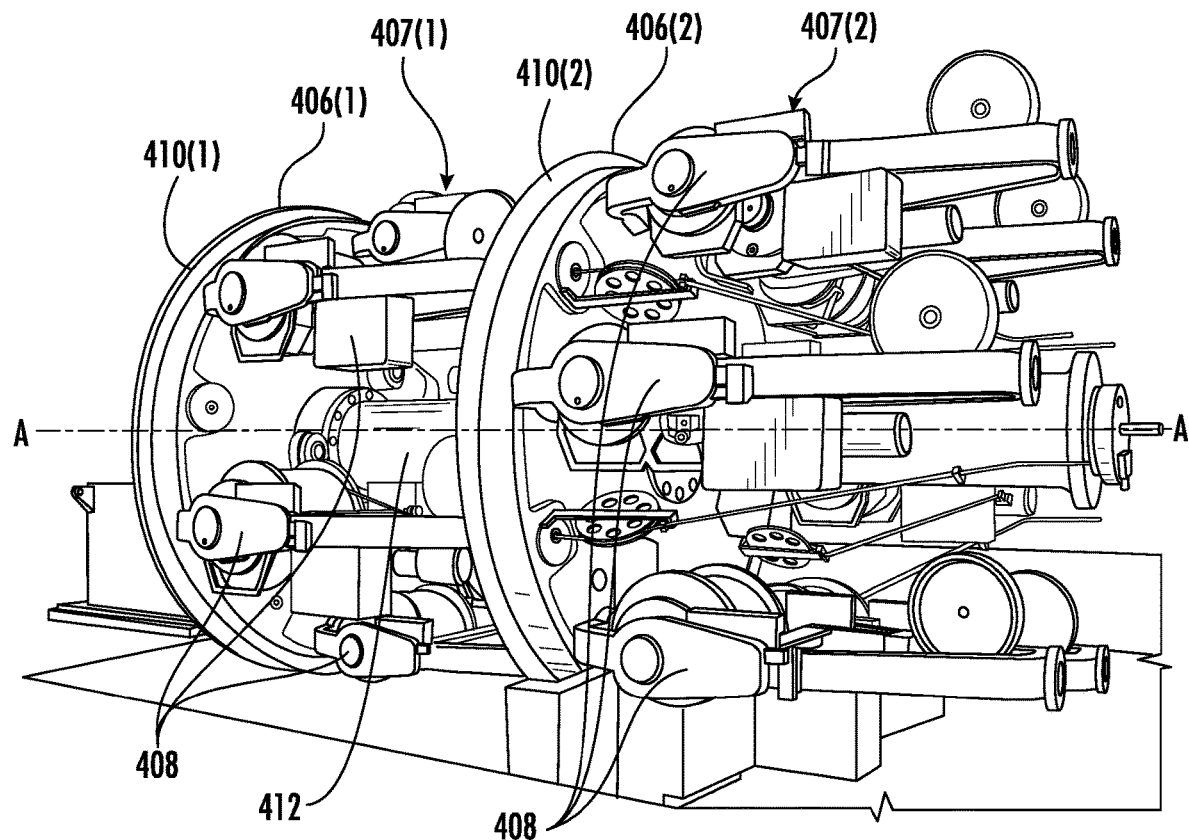
FIG. 4C is a perspective view of rotating structures of the strander of FIG. 4A.

Referring to FIG. 4C, each rotating structure 406 includes a chassis 410(1)-410(2) (referred to generally as chassis 410) and a set 407 of payoff units 408 (may also be referred to as a payoff assembly or subunit payoff) mounted to the chassis 410. The chassis 410 is mounted to a central axle 412 and configured to rotate around a center axis A defined by the central axle 412. The set 407 of payoff units 408 are mounted to the chassis 410. Further, in certain embodiments, the rotating structures 406(1)-406(6) and/or chassis 410 thereof rotate together (and do not rotate relative to each other). In certain embodiments, the rotating structures 406(1)-406(6) and/or chassis 410 thereof rotate independently from one another (and rotate relative to each other).

Figure 4D:
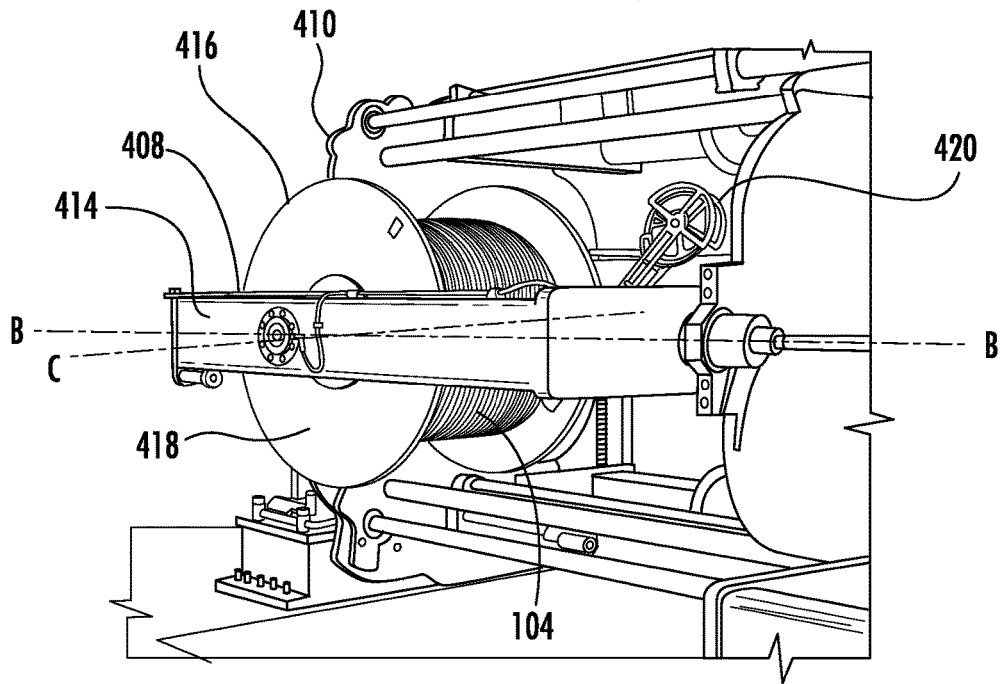
FIG. 4D is a perspective view of a payoff unit of FIG. 4C, including a dancer.

Referring to FIG. 4D, each payoff unit 408 includes a cradle 414 rotatably mounted to the chassis 410 and configured to rotate relative to the chassis 410. Each payoff unit 408 further includes a subunit package 416 rotatably mounted to the cradle 414. The subunit package 416 includes a subunit reel 418 configured to rotate relative to the cradle 414 and subunits 104 wrapped around the subunit reel 418. The subunit 104 is wound onto a subunit reel 418. In other words, each payoff unit 408 has a cradle 414 loaded with a subunit reel 418 of subunits 104. In this way, as the chassis 410 rotates around central axis A, the payoff unit 408 counter rotates around axis B relative to the chassis 410. Further, a subunit package 416 rotates around axis C relative to the payoff unit 408. In certain embodiments, each payoff unit 408 includes a dancer 420 for measuring subunit tension. The strander 400 controls payoff of the subunits 104 from subunit reels 418 mounted on the rotating chassis 410 of the strander 304. The strander 304 provides tension control of the individual subunits 104 during payoff by controlling the rotational speed of the subunit reel 418 with a reel drive motor in response to measured tension (e.g., through the dancer 420).

Tension of subunits 104 during payoff and stranding is an important control parameter for stranding and cable optical performance. The speed at which the subunit 104 is paid off and stranded must also be coordinated with the operational speed of various equipment units. A matter of particular importance to precisely subunit tension control and smooth strander operation is the subunit wind quality (traverse quality) of the subunit 104 on the subunit reel 418. It is important that when the subunit 104 is wound onto the subunit reel 418 prior to stranding, that the wind is evenly packed onto the subunit reel 418 (i.e., good wind quality). When the wind quality is poor, tension control is much more difficult, and in severe cases, subunit crossovers can occur, which may lead to a sudden increase in tension (i.e., tension event), which may result in optical defects in the subunit 104, may destabilize the entire line, may break the subunit 104, and/or may result in an emergency shutdown.

Figure 4E:
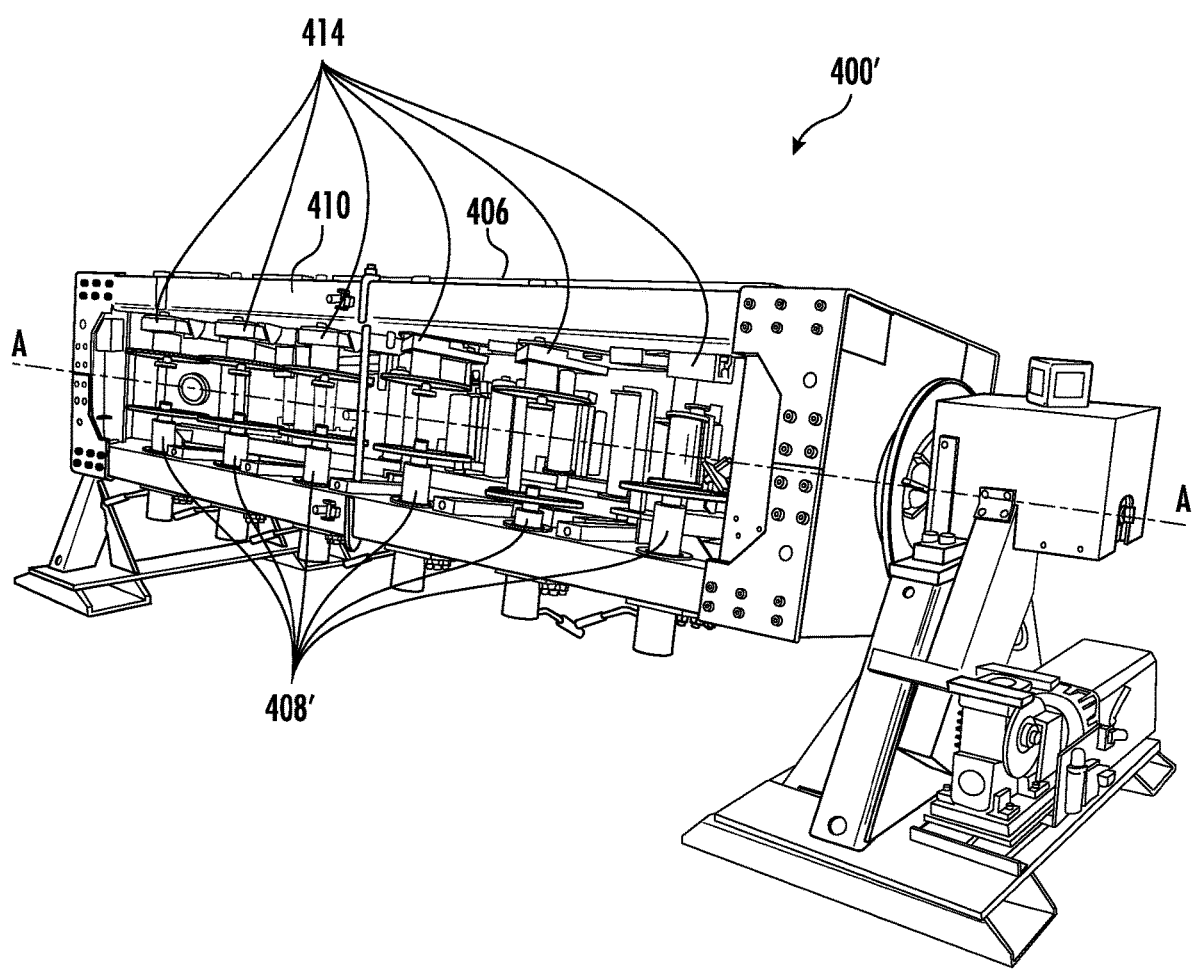
FIG. 4E is a perspective view of a rigid strander of the stranding system of FIGS. 3A-3B.

FIG. 4E is a perspective view of a rigid strander 400'. The rigid strander 400' is similar to the planetary strander 400 of FIG. 5 except where otherwise noted below. In particular, the rigid strander 400' includes one rotating structure 406 with one rotating chassis 410 supporting a plurality of sets of payoff units 408 ridigly mounted to the chassis 410. For example, the payoff units 408' may be positioned along an axis of the chassis 410 and/or around a central axis A of the rigid strander 400'. In this way, the cradle 414 of the payoff units 408' are rigidly (i.e., non-rotatably) mounted to the rotating chassis 410. It is noted that with a rigid strander, regions 500(2) and 500(3) refer to the same region (see FIG. 3A). In other words, regions 500(2) and 500(3) are a single rotating region.

Figure 5A:
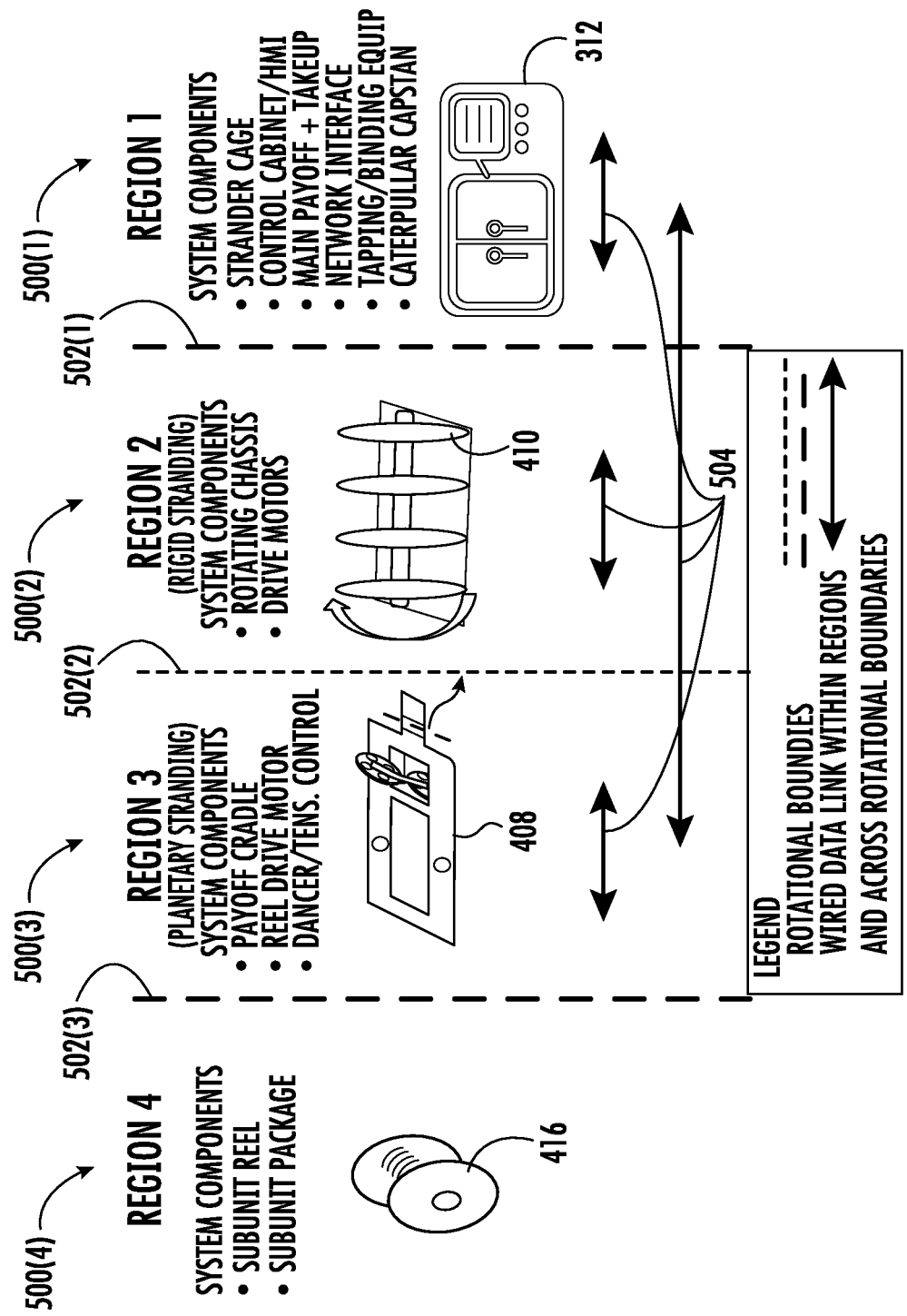
FIG. 5A is a diagram illustrating communication links across rotational boundaries of the strander of FIGS. 4A-4E using low bandwidth wired links.

FIG. 5A is a diagram illustrating communication links across rotational boundaries of the strander 400 (including planetary strander 400 and/or rigid strander 400') of FIGS. 4A-4E using low bandwidth wired links. The stranding system includes equipment regions 500(1)-500(4), rotational boundaries 502(1)-502(3), and wired data links 504. Transmission of tension measurements at a high sampling rate from each of the dancers 420 to the controller in the control cabinet 312 is needed to effectively control tension. Sending control information (e.g., drive speed control signals, setpoints, etc.) from the control cabinet 312 back to the payoff units 408 (including payoff unit 408 of the planetary strander 400 and/or payoff unit 408' of the rigid strander 400') is also needed. Typically, the copper media within the wired data links 504 are used within and across all regions 500 for electrical transmission, which requires slip rings for electrical continuity across rotational boundaries 502. Such a low-bandwidth configuration limits the ability to monitor and control the strander 400. Further, replacing copper with another wired solution presents challenges of transmitting data across multiple rotational boundaries associated with the strander 400.

Planetary stranders 400 have a secondary plane of rotation defining a second rotational boundary 502(2) due to counter-rotation of the payoff unit 408. Thus, electrical signals have to be transmitted across another slip ring to maintain communication between the control cabinet 312 and sensors and actuators from a wireless module associated with the payoff unit. Such a configuration is not suitable for high bandwidth sensors (e.g., video camera or other vision device) due to the low bandwidth capability of electrical transmission across the secondary rotational boundary 502(2).

Figure 5B:
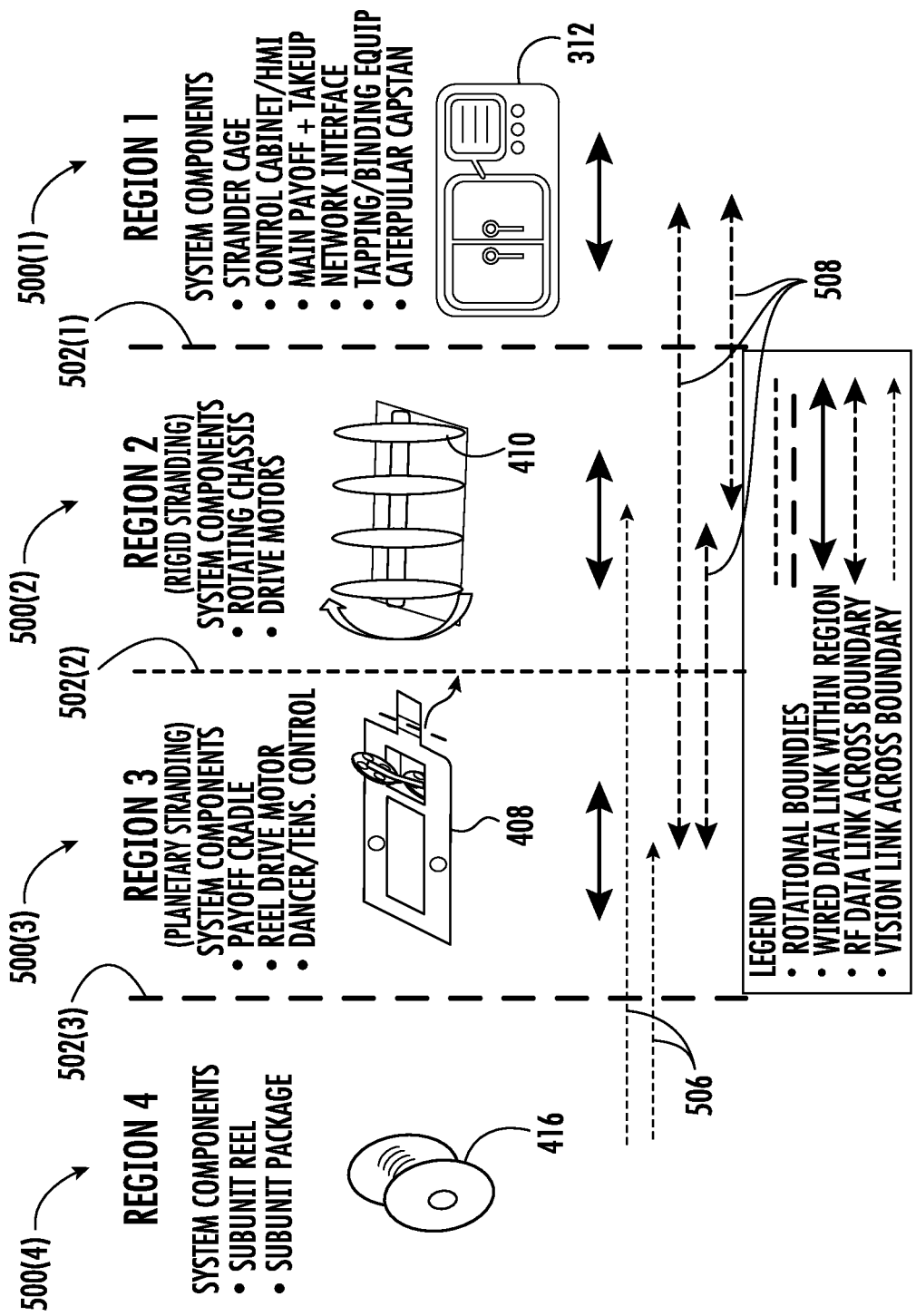
FIG. 5B is a diagram illustrating communication links across rotational boundaries of the strander of FIGS. 4A-4E using vision links and high bandwidth wireless links in accordance with aspects of the present disclosure.

FIG. 5B is a diagram illustrating communication links across rotational boundaries 502 of the strander of FIGS. 4A-4E using vision links 506 and high bandwidth wireless data links 508. The stranding system 300 includes sensors, control actuators, and a control cabinet. Further, the stranding system 300 uses the wireless data links 508 across rotational boundaries 502 instead of wired data links (e.g., copper). Accordingly, slip rings are no longer required for data links. In other words, power is provided through the slip ring, and wireless data links 508 are used for transmission of data (e.g., sensor and control signals).

In certain embodiments, the stranding system 300 includes a duplex wireless data link 508 between a wireless communication module (e.g., in region 2 500(2) or region 3 500(2)) traveling about a center axis of rotation of the rotation structure of the strander and a fixed wireless communication module (e.g., in region 1 500(1)) having an uplink bandwidth of at least 1 Gb/s (e.g., 5G). In certain embodiments, the fixed wireless communication module is part of a small cell network having an uplink speed of at least 1 Gb/s. In certain embodiments the fixed wireless module is wired to one or more antennas. In certain embodiments, the stranding system 300 provides high bandwidth data links between the strander 400 and a control cabinet 312 achievable by wideband wireless radio technology operating at sub-6 MHz frequencies or millimeter-wave frequencies (e.g., 28 MHz, 60 MHz) or any other suitable wireless frequency and operating with any other suitable wireless protocol including WiFi or WiFi-6.

In particular, the stranding system 300 uses a vision device with a vision link 506 across the rotational boundaries 502 to view the subunit package 416 and/or payoff unit 408, such as to proactively identify issues with the subunit package 416 (e.g., bad wind quality, etc.). For example, the control cabinet 312 may use sensor data to control the strander 400 (and/or stranding line) with a very low delay between sensor measurement and control actuator response (e.g., 20 ms response time for control loop, excluding video processing delay). Higher bandwidth/wideband data links 508 (e.g., 5G) in combination with suitable process monitoring and surveillance techniques (e.g., vision devices) can yield tighter control of key machine parameters and enable new cost-saving control capabilities for stranders 400, such as by early detection of process instability and/or rapid determination of an appropriate control response (e.g., slowing down the process or initiating a more controlled emergency shutdown).

Such a configuration may result in faster stranding speeds and longer/heavier optical element packages, which require greater process control and process stability. Such a configuration may result in improved process surveillance capabilities for the earliest possible detection of process instability and/or preventive maintenance needs. Such a configuration may result in improved analytical and computational methodologies to analyze the nature and probable causes of emerging process instabilities and determine the best control response (e.g., emergency stop procedure). Such a configuration may result in reduced latency of the control feedback loop to enable tighter machine control and faster control response to process instability.

Wideband data links 508 operating with low latency communication protocols can reduce overall latency in the control loop, thereby further enabling the development and integration of improved control strategies, including those leveraging edge computing capabilities accessed over a private wireless enterprise network or third-party service provider.

FIGS. 6A-6D are diagrams of the stranding system 300 with a vision device 600. In certain embodiments, the vision device 600 includes video cameras (e.g., high bandwidth-intensive video surveillance cameras) to capture images of the subunit packages 416 and/or the payoff unit 408 as the subunit 104 is paid off the subunit reel 418, and the images are wirelessly transmitted from a wireless communication module 602 (may also be referred to as a mobile wireless module, rotating wireless module, etc.) to a wireless access point 604 (may also be referred to as fixed wireless module). The vision device 600 is rigidly mounted and placed a sufficient distance to fit at least a portion of the subunit package 416 and/or the payoff unit 408 within the field of view (FOV) and/or focal range (e.g., using a wide-angle lens). In certain embodiments, the transmitted video images are processed in real-time. In certain embodiments, the transmitted video images are digitally captured and saved for future use.

In certain embodiments, the vision device 600 outputs video data (e.g., video bitstream). In certain embodiments, the stranding system includes an image processor 606 (e.g., video processor) configured to receive and process the vision data, resulting in one or more of video compression, video decompression, image reorientation, cropping, resizing, or adjustment of brightness, contrast, and/or color, etc. In certain embodiments, the vision device 600 includes the image processor 606. In certain embodiments, the image processor 606 is mounted to the cradle 414 of one of the set of payoff units 408. In certain embodiments, the image processor 606 (or another computer device in electronic communication with the vision device 600) includes an image analysis module 608, such as image feature recognition (e.g., flanges, subunit, traverse, etc.), motion detection and/or template matching, etc. The image analysis module 608 is configured to analyze processed vision data to identify payout hazards. In certain embodiments, the image analysis module 608 analyzes processed vision data to recognize patterns in wrapping of the subunit on the subunit reel corresponding to payout hazards. In certain embodiments, the image analysis module 608 analyzes processed vision data to evaluate payoff hazards based on observed positioning and movement of the dancer 420. In certain embodiments the image analysis module 608 correlates dancer 420 position and movement with subunit tension during payoff. The vision device 600, image processor 606, and/or image analysis module 608 may be placed together or separately from one another in regions 500(1)-500(3). For example, the vision device 600 may be placed in any of regions 500(2), 500(3). The image processor 606 may be placed in any of regions 500(1)-500(3). The image analysis module 608 may be placed in any of regions 500(1)-500(3) (e.g., separate from the image processor 606).

In this way, the strander 400 includes vision monitoring and alarming capabilities supported by a wideband data link 508 between the wireless communication module 602 on the strander 400 to a wireless access point 604. The stranding system 300 includes error detection and forward error correction capabilities through techniques including anomaly detection (e.g., crossover detection), dynamic pattern recognition (e.g., unexpected motion/package instability), and/or implementation of alarm code and alarm signal generation and timing prediction of expected tension event etc. The transmitted video images are machine-analyzed to detect subunit crossovers, poor subunit wind quality, or other signs of emerging subunit package 416 instability that may lead to loss of tension control or emergency shutdown.

An alarm signal is generated and transmitted to the control cabinet 312, where the best control responses are machine-determined and transmitted to the needed control mechanisms of the strander 400 and other line equipment. In particular, a line control module 610 (e.g., at the control cabinet 312) configured to control operation of the strander 400 is in communication with the vision device 600 via a wireless access point 604. In certain embodiments, the image analysis module 608 is configured to generate an alarm signal upon identification of a payout hazard. Then, the line control module 610 is configured to slow or stop operation of the strander 600 upon receipt of the alarm signal. In certain embodiments, the stranding system 600 includes an output, such as report generation, video compression, and/or output to storage file, etc.

In certain embodiments, the stranding system 300 includes private mobile edge computing (MEC), providing a private network with edge computing capabilities using wireless data links 508 (e.g., 5G), such as may include low latency and high performance. In certain embodiments, the stranding system 300 operates edge services on AWS (Amazon Web Services) Outposts. Computer vision and machine learning models are used to process sensor data received from stranders to send commands to the stranders over a network (e.g., 5G network).

In certain embodiments, the stranding system 300 includes other non-video sensors (e.g., motion sensors, accelerometers, electromagnetic field sensors, sonic sensors, seismic sensors, etc.). In certain embodiments, the stranding system includes anomaly detection/characterization techniques applied to video images or other sensed signals. In certain embodiments, the stranding system includes high-speed computational capabilities afforded by emergent Edge computing technology. In certain embodiments, the stranding system includes artificial intelligence/machine learning for optimization of advanced algorithms, control methodologies, and advancement of fundamental process understanding.

Figure 6A:
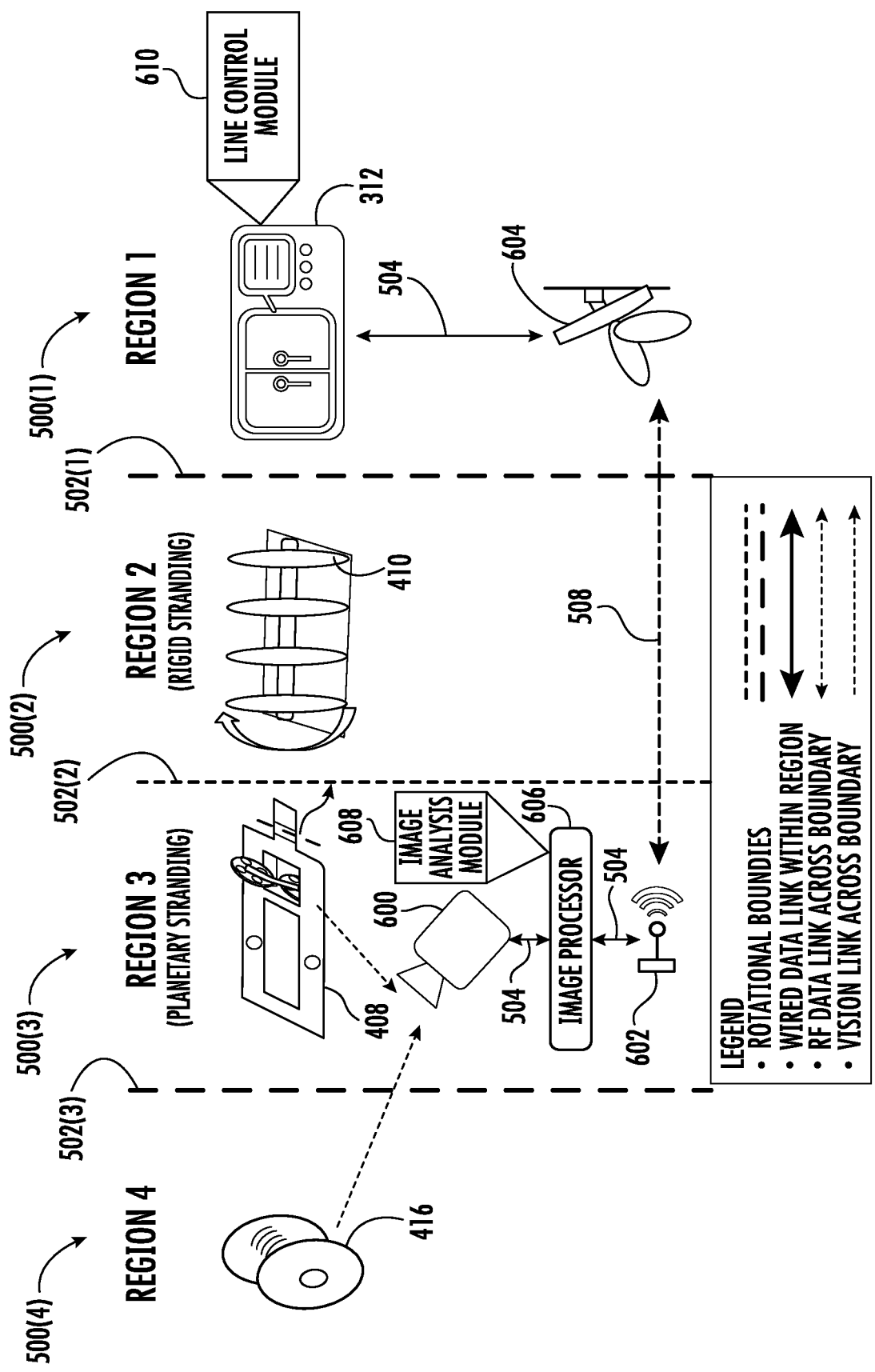
FIG. 6A is a diagram of one embodiment of the stranding system of FIG. 5B with a vision device positioned in a same region as a cradle of a payoff unit of a rotating structure of the strander.

Referring to FIG. 6A, a vision device 600 is positioned in a same region as (and mounted to) a cradle 414 of a payoff unit 408 of a rotating structure 406 of the strander 400. The vision device 600 is mounted to the rotating structure 406 and configured to capture a view of at least a portion of the subunit package 416 and/or at least a portion of the dancer 420 of at least one of the payoff units 408 to generate vision data. The wireless communication module 602 is mounted to the rotating structure 406 and configured to receive and wirelessly transmit the vision data. In certain embodiments, the at least one first wireless communication module 602 is configured to wirelessly transmit the vision data at a rate of at least 1 Gb/s (e.g., 5G).

The image processor 606 is wired to and co-located with a vision device 600 on a payoff unit 408. Co-located as used herein means anywhere on the strander 300 where the vision device 600 and wireless communication module 602 can be wired together without crossing a rotational boundary 502. In certain embodiments, each rotation structure 406 includes a plurality of vision devices 600 (one for each payoff unit 408), with a wireless communication module 602 wired to each camera. In certain embodiments, dedicated wireless modules, are wired to dedicated video processing modules.

In certain embodiments, a shared wireless module is wired to all vision devices 600. Shared wireless module may be a multichannel radio or may be a single channel radio carrying a multiplexed video bitstream.

Figure 6B:
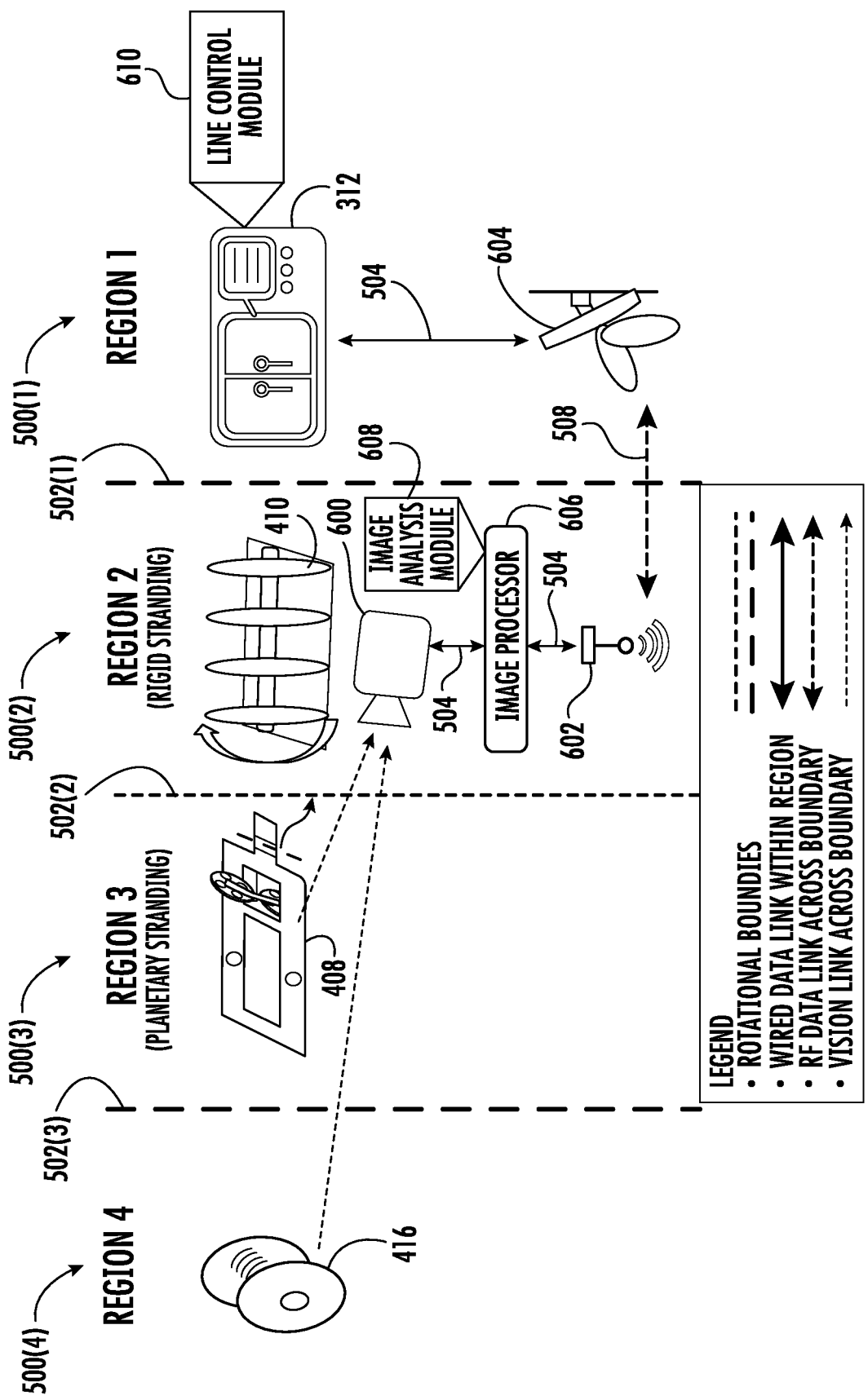
FIG. 6B is a diagram of one embodiment of the stranding system of FIG. 5B with a vision device positioned in a same region as a chassis of a rotating structure of the strander.

Referring to FIG. 6B, a vision device 600 is positioned in a same region 500(2) as (and mounted to) a chassis 410 of a rotating structure 406 of the strander 400. The vision device 600 is configured to capture the view of at least a portion of the subunit package 416 and at least a portion of the dancer 420 of a plurality of a set 407 of payoff units 408. The image processor 606 is mounted to the chassis 410 and in wireless communication with the vision device 600. In certain embodiments, the image processor 606 is mounted to the chassis 410 and in wireless communication with the vision device 600 and a wireless access point 604 remote from the strander 400.

For both of the embodiments of FIGS. 6A-6B, a wireless communication module 602, image processor 606, and/or image analysis module 608 is wired to and co-located with a vision device 600 (e.g., on counter-rotating portion of planetary payoff unit 408 or chassis 410). As used herein, "co-located" means anywhere on the strander 400 where two devices can be wired together without crossing a rotational boundary 502.

In certain embodiments, a plurality of vision devices 600 are mounted to a respective one of the set of payoff units 408. In certain embodiments, shared wireless communication module 602 is wired to a plurality of vision devices 600 and/or image processing modules 608 and is located on a rotating portion of a strander 400. Each vision device 600 is located on a payoff unit 408.

The shared wireless communication module 602 may transmit processed or unprocessed video and alarm signals across the wireless data link 508. The wireless communication module 602 may be a multichannel radio or may be a single channel radio carrying multiplexed video bitstreams and/or alarm signals from the video module.

In certain embodiments, at least one first vision device 600 of a first set is mounted to a first rotating structure 406(1), and a second vision device 600 of a second set is mounted to a second rotating structure 406(2). The at least one first vision device 600 is configured to capture a first view of at least a portion of the subunit package 416 of at least one of the first set 407(1) of payoff units 408 to generate first vision data. The at least one second vision device 600 is configured to capture a second view of at least a portion of the subunit package 416 of at least one of the second set 407(2) of payoff units 408 to generate second vision data. At least one first wireless communication module 602 is mounted to the first rotating structure 406(1). The at least one first wireless communication module 602 is configured to receive and wirelessly transmit the first vision data. At least one second wireless communication module 602 is mounted to the second rotating structure 406(2). The at least one second wireless communication module 602 is configured to receive and wirelessly transmit the second vision data.

Figure 6C:
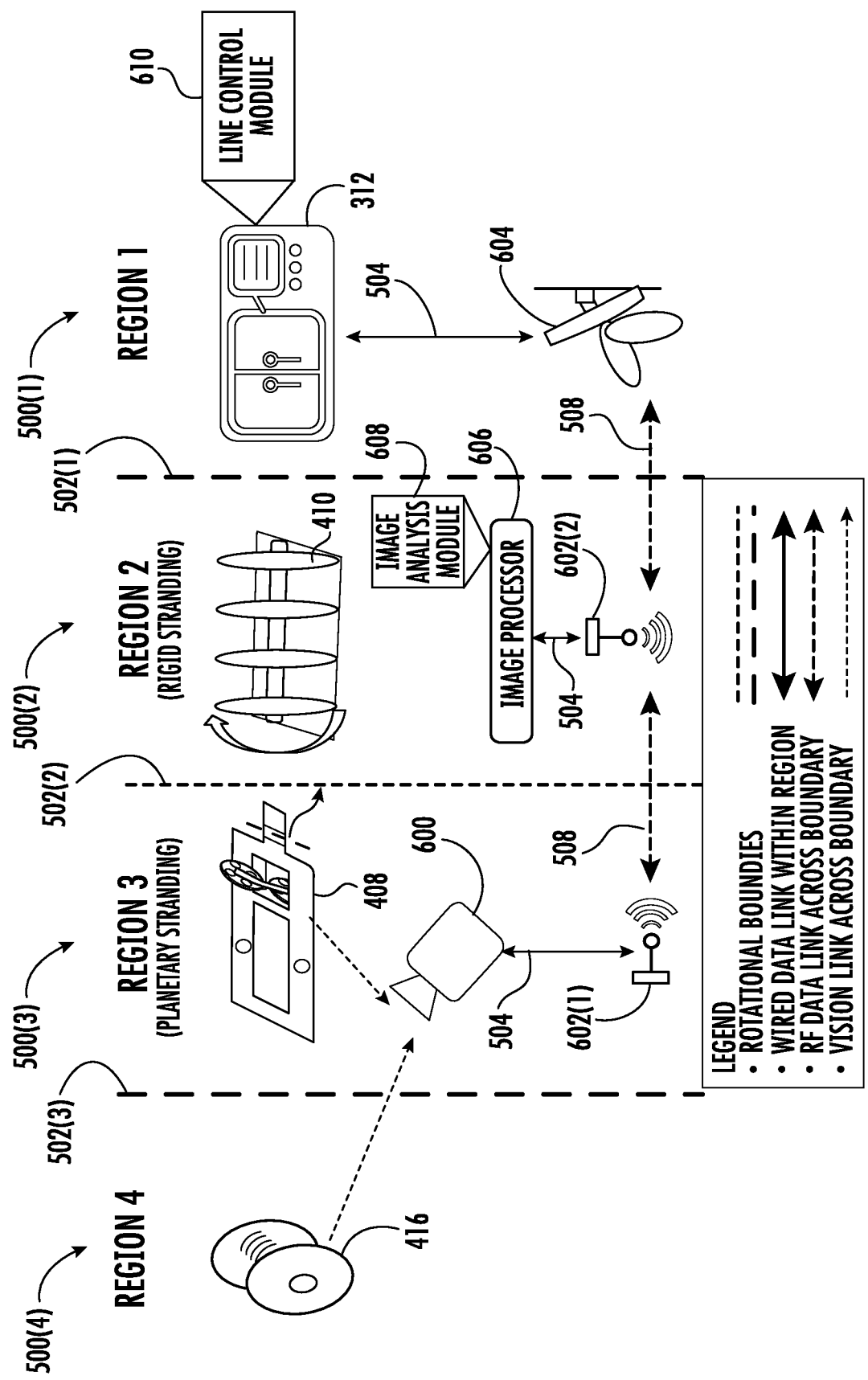
FIG. 6C is a diagram of one embodiment of the stranding system of FIG. 5B with a vision device positioned in a same region as the cradle of the payoff unit and the image processor in a same region as a chassis of a rotating structure of the strander.
Figure 6D:
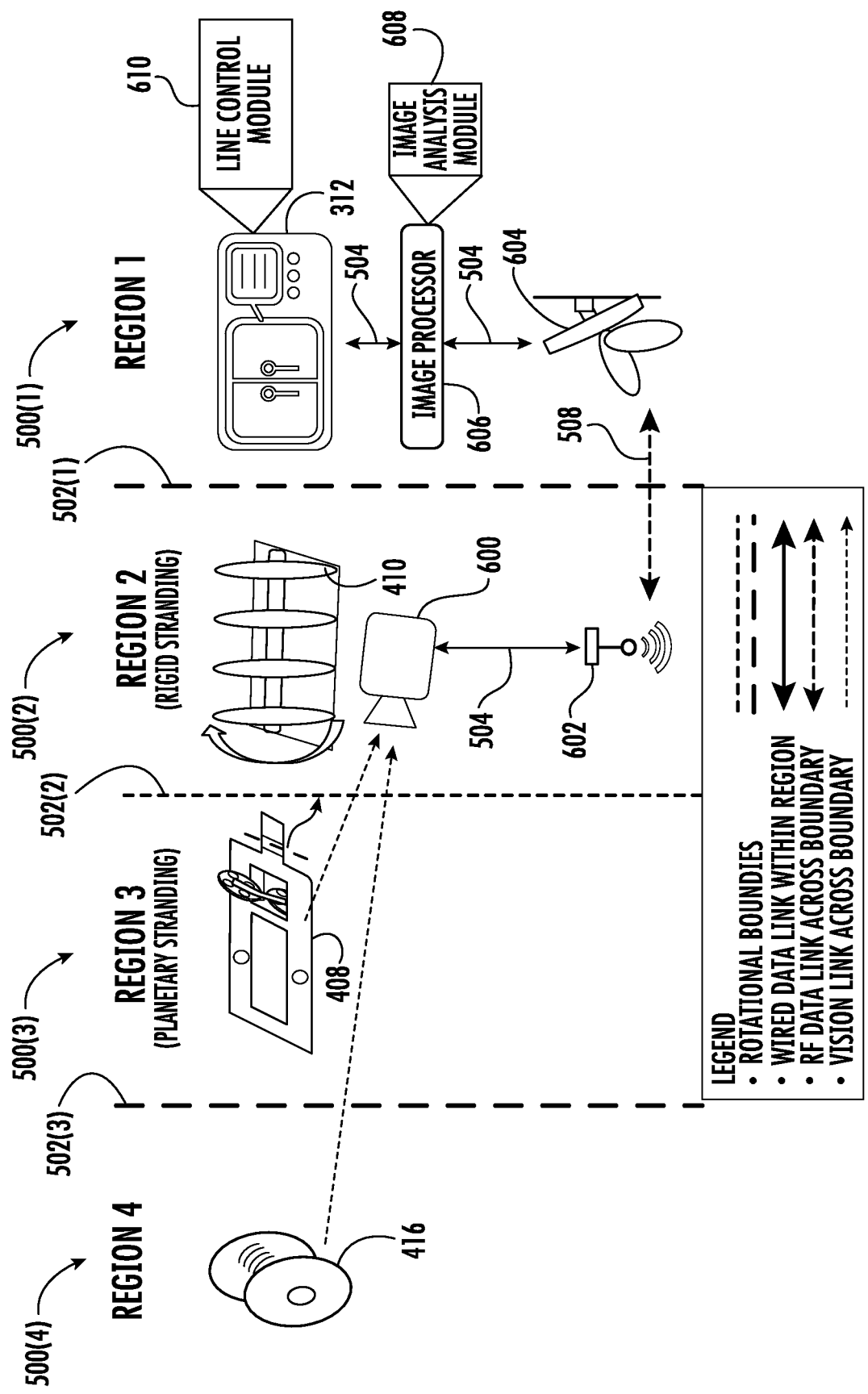
FIG. 6D is a diagram of one embodiment of the stranding system of FIG. 5B with a vision device positioned in a same region as the cradle of the payoff unit and the image processor in a same region as a control cabinet.

Referring to FIGS. 6C-6D, a vision device 600 may be positioned in a different region 500 than the image processor 606. Vision devices are wired to a wireless module on the strander with video streamed wirelessly to a fixed wireless access point or radio to which the dedicated modules are wired.

Referring to FIG. 6C, the vision device 600 is positioned in a same region 500(3) as the cradle 414 of the payoff unit 408 and the image processor 606 in a same region 500(2) as a chassis 410 of a rotating structure 406 of the strander 400. The vision device 600 wirelessly communications over the data link 508 via a wireless communication module 602(1), 602(2) with the image processor 606. Accordingly, the image processor 608 may communicate with a plurality of vision devices 600.

Referring to FIG. 6D, the vision device 600 is positioned in a same region 500(2) as the chassis 410 and the image processor 606 in a same region 500(1) as a control cabinet 312. The image processor 606 is mounted remotely from the strander 400 and in wireless communication with the vision device 600 via a wireless access point 604. Unprocessed/unanalyzed bit stream is wirelessly transmitted to the image processing module 608 located off the strander 400. Wireless communication modules 602 may transmit across the wireless data link 508 processed or unprocessed video bitstreams received from the vision device 600.

In certain embodiments, an array of dedicated image processors 606 and/or image analysis modules 608 are at a fixed location off the strander 400. An array of dedicated image processors 606 and/or image analysis modules 608 could be within an enclosure inside or outside of the stranding cage, such as inside a main control cabinet or an auxiliary cabinet. The array of image processors 606 and/or image analysis modules 608 could also be at a remote location connected to a communications network, such as an enterprise LAN (local area network), wireless LAN, an industrial communications network, an industrial control network, or on an externally hosted server in the cloud or at the cloud edge.

In certain embodiments, a shared image processor 606 and/or image analysis modules 608 are at a fixed location off the strander 400. Vision devices 600 are wired to a wireless communication module 602 on the strander 400 with video streamed wirelessly to a fixed wireless access point 604 or radio to which the shared image processors 606 and/or image analysis modules 608 are wired. Shared image processors 606 and/or image analysis modules 608 could be within an enclosure inside or outside of the stranding cage, such as inside a main control cabinet or an auxiliary cabinet. The shared module could also be at a remote location connected to a communications network such as an enterprise LAN, wireless LAN, an industrial communications network, an industrial control network, or on an externally hosted server in the cloud or at the cloud edge.

Figure 7A:
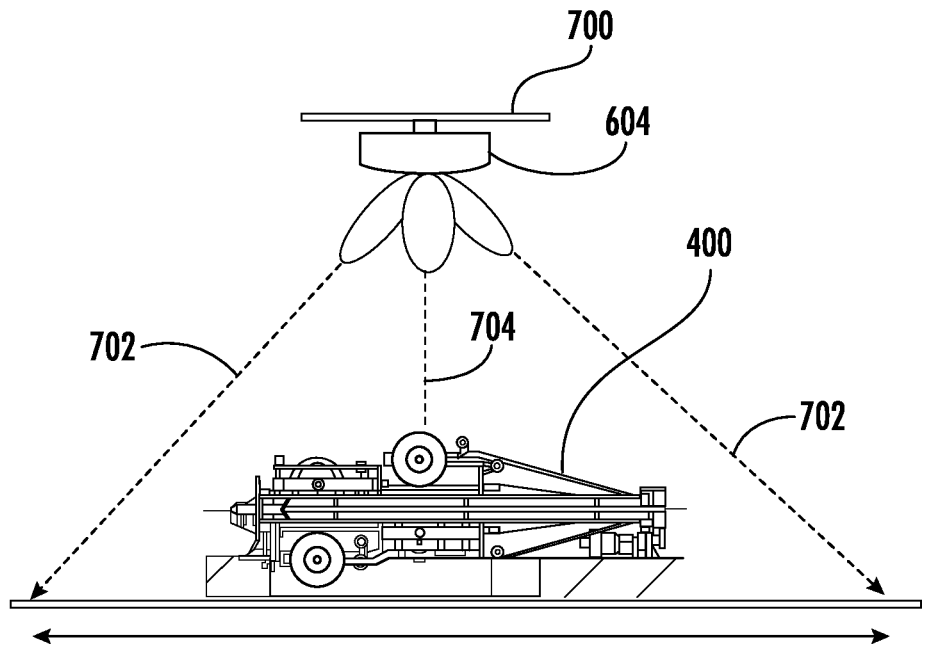
FIG. 7A is a diagram illustrating a wireless access point mounted to a horizontal support above a strander in communication with a control device.
Figure 7B:
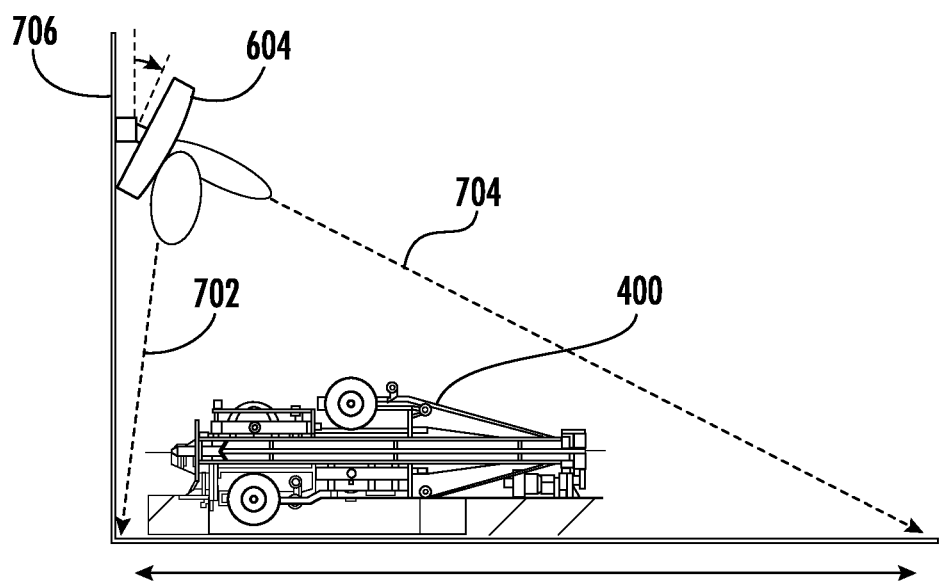
FIG. 7B is a diagram illustrating a wireless access point mounted on a vertical support in communication with a control device.

FIGS. 7A and 7B are diagrams illustrating the mounting of a wireless access point 604 in communication with a control cabinet 312. The wireless access point 604 includes one or more antennas and is connected to a small cell base station or other network equipment to provide wireless coverage to a small coverage area for the purpose of communicating with the in-motion wireless units mounted on the strander 400. In certain embodiments, the wireless access point 604 may be within in a cage surrounding the strander and the cage may be equipped with shielding to shield against interference from the surrounding environment. In certain embodiments, a wideband wireless data link 508 operates at millimeter wavelength frequencies, which in some instances may require an uninterrupted line of sight signal path between a vision device 600 and wireless access point 604.

In FIG. 7A, the wireless access point 604 is mounted to a horizontal support member 700 (e.g., ceiling) above a strander. Edge beams 702 can be narrowly focused to provide more direct energy to cover wireless modules at coverage edge for wider coverage and better performance. Center beams 704 can be wider as their distance to wireless modules is shorter and wider beams mean the same area can be covered sufficiently with a fewer number of beams, hence less overhead. In certain embodiments, a single wide angle beam may In FIG. 7B, the wireless access point is mounted to a vertical support 706 (e.g., wall). Center beams 704 define coverage and should be narrowly focused to provide more direct energy at coverage edge for wider coverage and better performance. Edge beams 702 can be wider as their distance to wireless modules on the strander 400 are shorter and wider beams mean the same area can be covered sufficiently with a fewer number of beams, hence less overhead.

Figure 8:
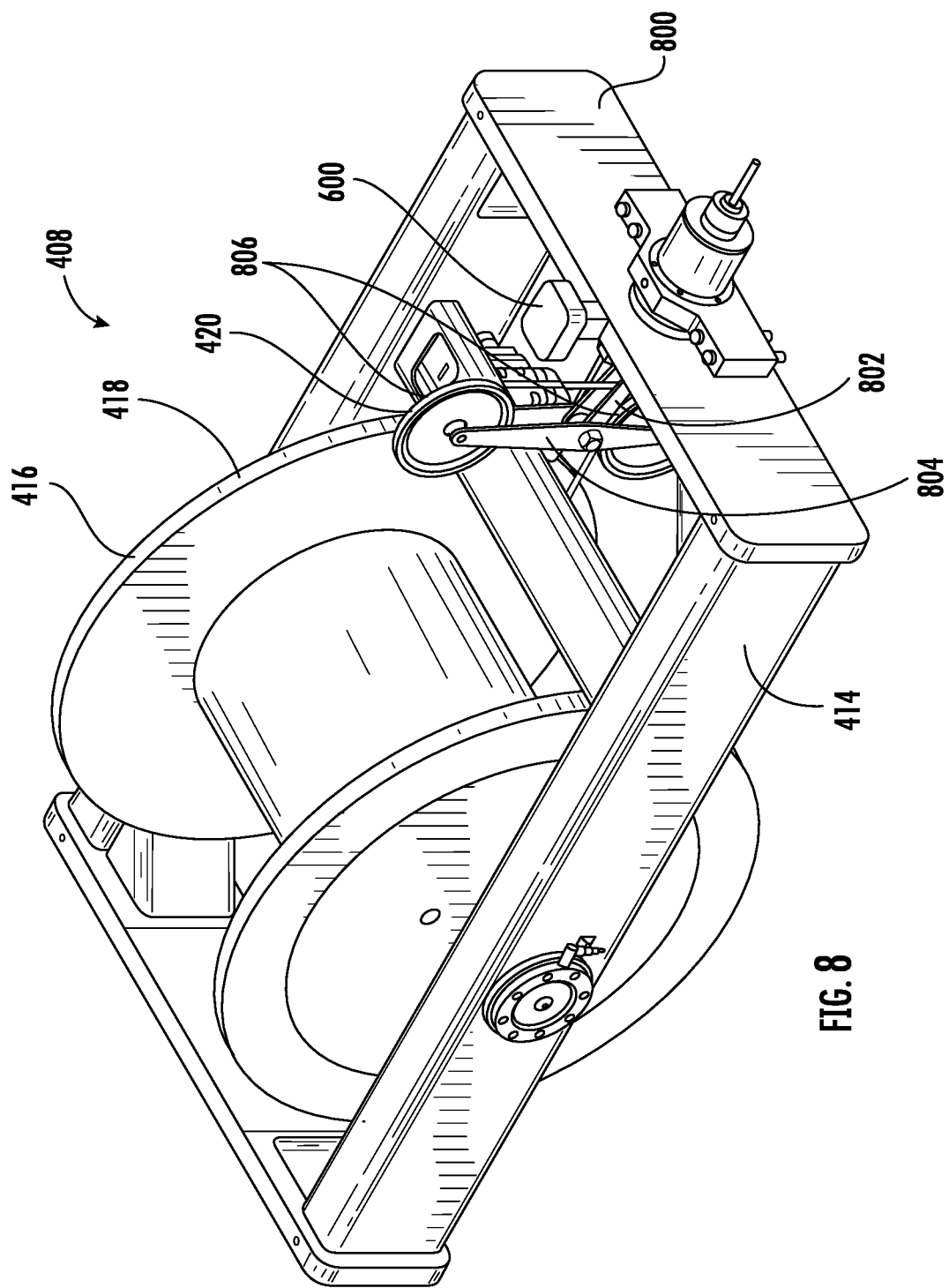
FIG. 8 is a perspective view of a payoff unit with a vision device mounted to a cradle of the payoff unit.

FIG. 8 is a perspective view of a payoff unit 408 with a vision device 600 mounted to a cradle 414 of the payoff unit 408. The payoff unit 408 includes a cradle 414 with a payoff cross member 800. A subunit reel 418 of a subunit package 416 is rotatable mounted within the cradle 414. In certain embodiments, the payoff unit 408 also includes a drive motor and/or a brake assembly.

The payoff unit 408 further includes a traverse guide bar 802 mounted to the cradle 414 and a dancer 420 attached to the traverse guide bar 802. In particular, the dancer 420 includes a dancer arm 804 and pulleys 806 (e.g., sheaves). The dancer 420 is configured to measure tension of the subunit, such as by angular displacement of the dancer arm 804. The dancer 420 is a tension measuring device that has two pulleys 806 (e.g., sheaves), with the subunit 104 threaded around the pulleys 806. Changes in the tension of the subunit 104 during payoff act upon the pulleys 806 to change the angular position of the dancer arm 804, thereby providing an indication of tension. The tension measurement may be used by the controller to make rapid adjustments to the payoff drive motor speed to maintain the subunit tension at the desired setpoint. The subunit package 416 further includes a hollow-core bearing and slip ring and the attachment of the cradle 414 to a strander plate. The payoff unit 408 is affixed to the chassis 410 (e.g., strander plate) in a manner allowing it counter-rotate with respect to the rotational motion of the chassis 410 (for planetary stranding).

The traverse guide bar 802 supports the dancer 420 in a manner that allows the dancer to float as it follows and receives the subunit 104 paid off the subunit reel 418. In other words, the traverse guide bar 802 allows the dancer 420 to float back and forth between sides of the cradle 414.

In certain embodiments, the vision device 600 is mounted to the payoff cross member 800 (at a distance above the cross member 800). Accordingly, the vision device is configured to capture a view of the subunit package 416 and at least a portion of the dancer 420. In certain embodiments, the vision device 600 is configured to capture an upper portion of the dancer 420 (in a lower portion and a foreground of an image) and capture an upper portion of the subunit package 416 (in an upper portion and a background of an image).

Figure 9A:
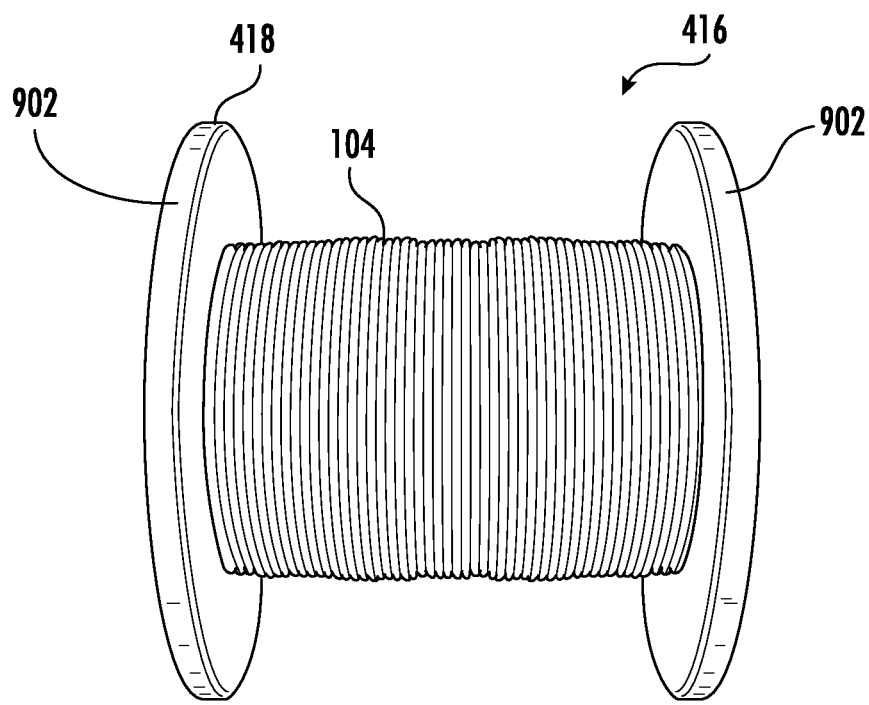
FIG. 9A is a perspective view of a subunit package of the strander of FIGS. 4A-4E illustrating even spread due to tight packing of a subunit on a reel.
Figure 9B:
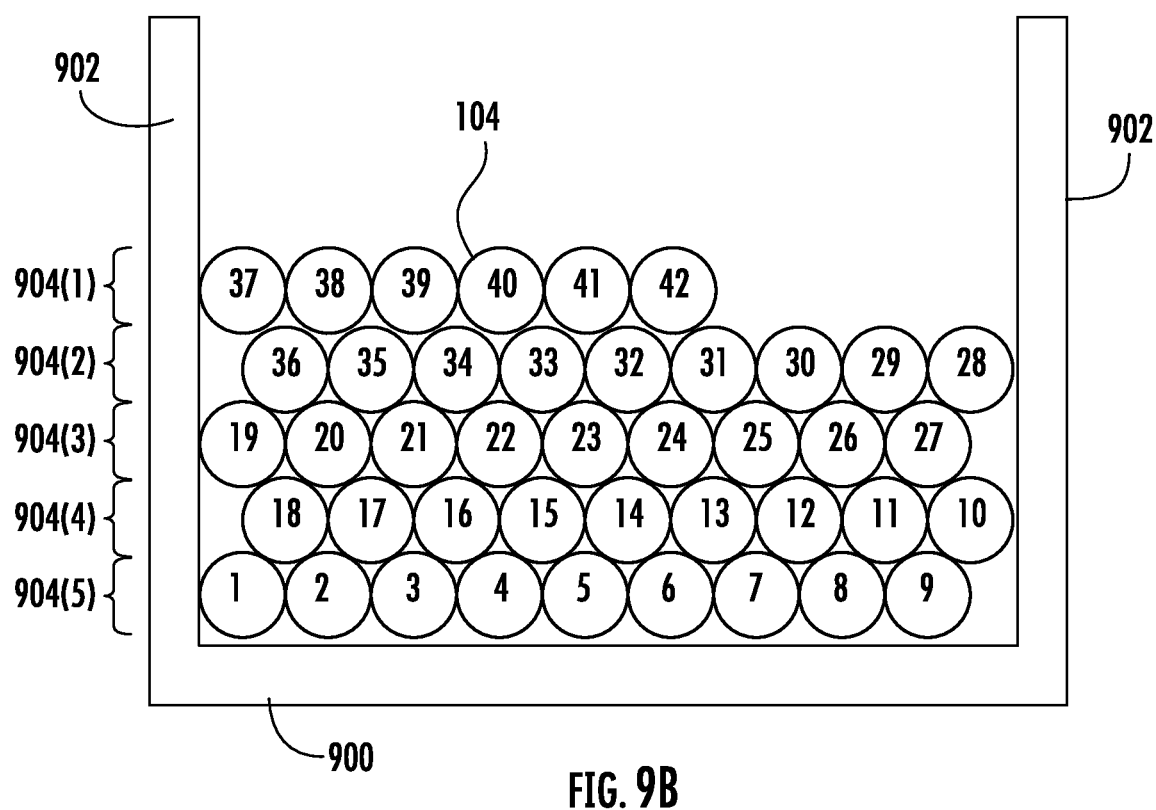
FIG. 9B is a cross-sectional view of the subunit package of FIG. 9A illustrating even spread due to tight packing of the subunit on the reel.

FIGS. 9A-9B illustrate good wind quality of a subunit 104 on a subunit reel 418 of a subunit package 416. FIG. 9A is a perspective view of a subunit package 416 of the strander system 300 of FIGS. 4A-4E illustrating even spread of a subunit 104 on a subunit reel 418. FIG. 9B is a cross-sectional view of the subunit package of FIG. 9A illustrating even spread of the subunit 104 on the subunit reel 418.

The subunit 104 is wrapped around a drum 900 of the subunit reel 418, between flanges 902 of the subunit reel 418. The layers 904(1)-904(5) of the subunit 104 are tightly packed and level. In particular, the outermost layer 904(1) of the subunit 104 is tightly packed and level. In certain embodiments, each of the first set of payoff units includes fiducial markers to aid at least one of an image processor 606 or an image analysis module 608. In certain embodiments, to facilitate video capture, processing, and/or analysis, datum or fiduciary marks and reel identification marks are present on inside flange 902. Datum marks ensure proper image orientation, cropping, resizing, and positioning against reference templates. Reel identification marks may help ensure/verify correct template file selection and other information to be used by the image analysis module 608. In certain embodiments, optional printed features on subunit may include subunit identifiers and length markings. Subunit identifiers may help ensure/verify correct template file selection and other information to be used by the image analysis module 608. Length marks may be useful for a variety of tracking and reporting features.

In certain embodiments, winds of the subunit 104 may be illuminated on the surface of the subunit reel 418 with visible or nonvisible light of a selected wavelength to enhance image quality and surface reflectivity. In certain embodiments, reflections off the tubular surface of the subunit 104 produce a reflected light intensity profile into the camera lens where the reflected light intensity is a function of the angle of incidence of the illumination source to the curved surface of the subunit 104 and the placement of the camera to capture the reflected light. The light intensity profile aids the vision system in characterizing the angular orientation of the subunit winds on the subunit reel 418.

Figure 10A:
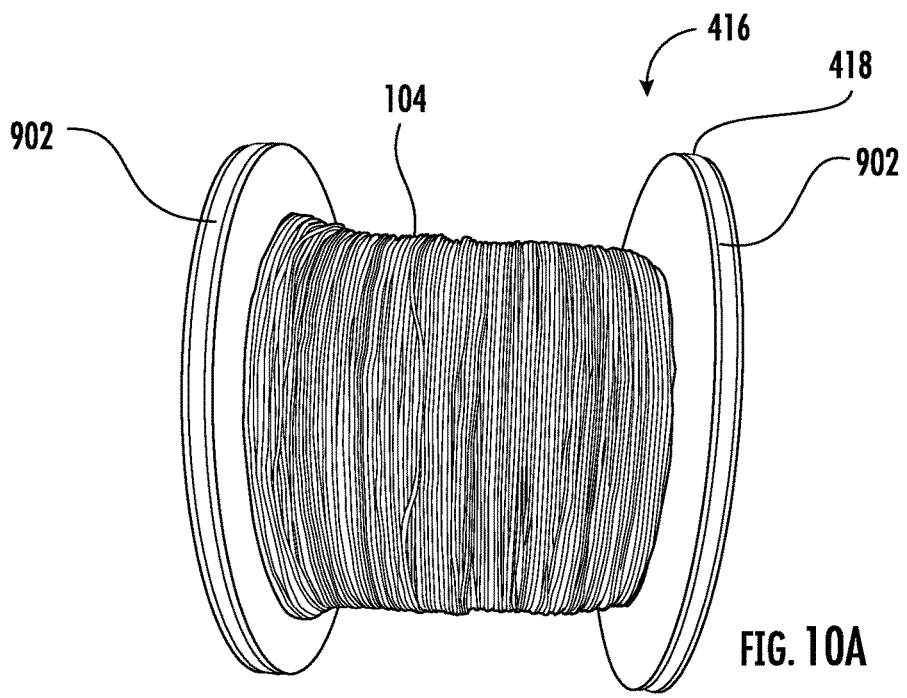
FIG. 10A is a perspective view of a subunit package of the strander of FIGS. 4A-4E illustrating uneven spread due to loose packing of a subunit on a reel.
Figure 10B:
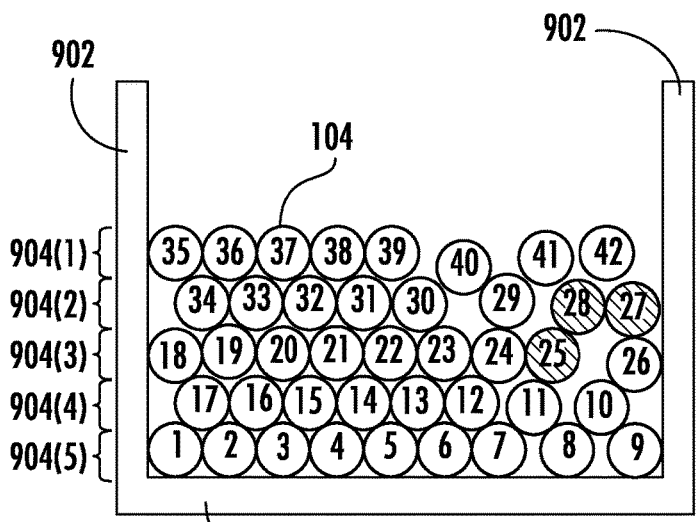
FIG. 10B is a cross-sectional view of one embodiment of the subunit package of FIG. 10A, illustrating uneven spread of the subunit on the reel due to loose packing.
Figure 10C:
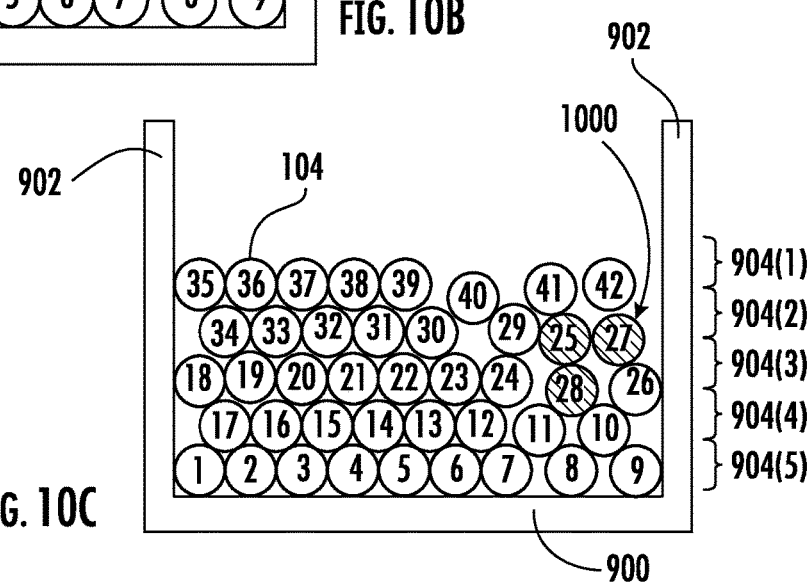
FIG. 10C is a cross-sectional view of one embodiment of the subunit package of FIG. 10A, illustrating uneven spread of the subunit on the reel and presence of a crossover.

FIGS. 10A-10C illustrate poor wind quality (e.g., uneven spread) of a subunit 104 on a subunit reel 418 of a subunit package 416. It is noted that even if a subunit package 416 with good wind quality is delivered to the strander 400, the wind on the package can change during stranding due to shifting of the subunit 104 caused by centrifugal forces on the package at sufficiently high RPM (revolutions per minute).

FIG. 10B is a cross-sectional view of one embodiment of the subunit package 416 of FIG. 10A illustrating uneven spread of the subunit 104 on the subunit reel 418 due to loose packing. Loose packing can allow shifting and rearrangement of subunit 104 further leading to uneven distribution and creation of uneven layers. In particular, the outermost layer 904(1) of the subunit 104 is not level, which may indicate a potential problem in the winding.

FIG. 10C is a cross-sectional view of one embodiment of the subunit package 416 of FIG. 10A illustrating formation of a crossover 1000 due to rearrangement of subunit 104 allowed by loose packing and uneven spread of the subunit 104 on the subunit reel 418. Due to loose packing and/or inconsistent tension, among other potential factors, a crossover 1000 is formed where the $28^{th}$ wind is surrounded by lower numbered winds that were wound onto the reel before the $28^{th}$ wind. The image analysis module 608 can recognize (e.g., using anomaly detection, motion detection, and/or pattern recognition, etc.) the crossover 1000 as soon as it is revealed by the removal of an upper layer 904(1) of the subunit 104. From that point in time, the subunit 104 will continue to be paid off the subunit reel 418 until the crossover 1000 is encountered, thereby preventing the subunit 104 from coming off the subunit reel 418 due to the surrounding lower numbered winds. At that point, the tension increases significantly, either damaging or severing the subunit 104 (or damaging the strander 400). In certain embodiments, the image analysis module 608 detects a crossover 1000 only based on the winds of the subunit 104 on the subunit reel 418 (rather than dancer movement). The image analysis module 608 can be taught to detect a crossover 1000 based, for example, on pattern recognition.

The image analysis module 608 may also be taught to recognize other types of risks, hazards, or other disorders, such as by teaching the image analysis module 608 what high-quality windings look like (e.g., neat, orderly, tightly packed, etc.). The image analysis module 608 may then compare taut high-quality winding formations with visually observed winding formations and determine a measure of discrepancy therebetween. Such a measure can give an indication of a probability that a hazard may be present, such as the presence of a crossover 1000 beneath the surface, potential for the subunit 104 to rearrange on the subunit reel 418 and form a crossover 1000, and/or potential for an undesirable low level of tension control by the dancer 420, etc. In certain embodiments, the line control module 610 may stop the strander 400, slow down the strander 400, or take another corrective action. For example, in certain embodiments, the line control module 610 may receive an alarm signal from the image analysis module 608 and slow down the strander 400 for additional time and data collection to determine whether the likelihood of the hazard increases or decreases.

In certain embodiments, the line control module 610 considers dancer movement caused by the subunit 104 coming off the subunit reel 418. In particular, when the windings onto the drum 900 of the subunit reel 418 are neat, orderly, and well packed, the dancer 420 will traverse smoothly (e.g., consistently) back and forth between the two flanges 902 as the subunit 104 comes off the subunit reel 418. Accordingly, the line control module 610 can be taught to monitor for erratic movement, which would be recognizable as a departure from that expected smooth motion.

Figure 11:
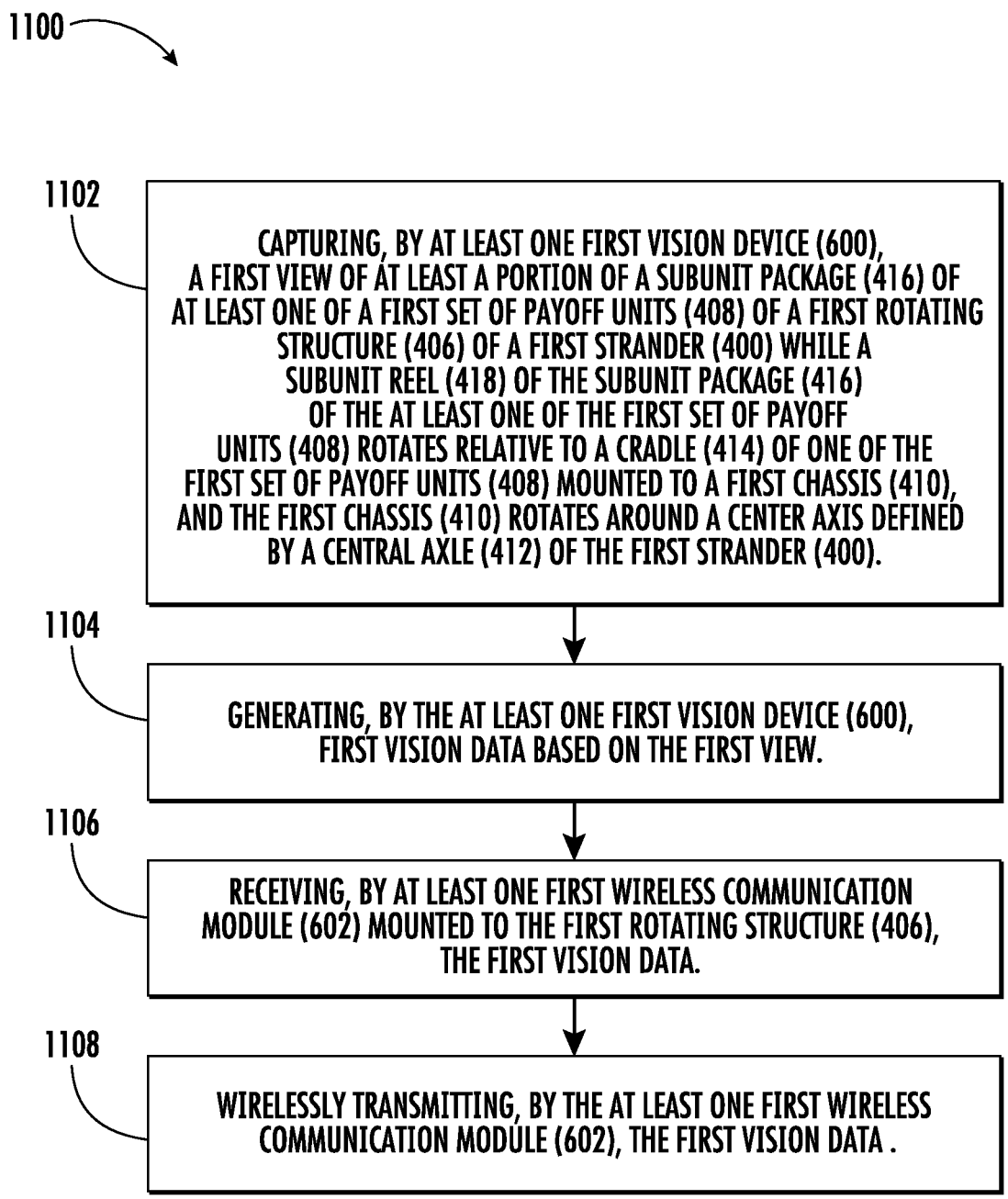
FIG. 11 is a flowchart of steps for using a measurement system in accordance with aspects of the present disclosure.

FIG. 11 is a flowchart 1100 of steps of controlling a stranding system. Step 1102 includes capturing, by at least one first vision device 600, a first view of at least a portion of a subunit package 416 of at least one of a first set of payoff units 408 of a first rotating structure 406 of a first strander 400 while a subunit reel 418 of the subunit package 416 of the at least one of the first set of payoff units 408 rotates relative to a cradle 414 of one of the first set of payoff units 408 mounted to a first chassis 410, and the first chassis 410 rotates around a center axis defined by a central axle 412 of the first strander 400. Step 1104 includes generating, by the at least one first vision device 600, first vision data based on the first view. Step 1106 includes receiving, by at least one first wireless communication module 602 mounted to the first rotating structure 406, the first vision data. Step 1108 includes wirelessly transmitting, by the at least one first wireless communication module 602, the first vision data (e.g., at a rate of at least 1 Gb/s).

In certain embodiments, the method further includes capturing, by at least one first vision device 600, a first view of at least a portion of a subunit package 416 of at least one of a first set of payoff units 408 of a first rotating structure 406 of a second strander 400 while a subunit reel 418 of the subunit package 416 of the at least one of the first set of payoff units 408 rotates relative to a cradle 414 of one of the first set of payoff units 408, the first chassis 410 rotates around a center axis defined by a central axle 412 of the first strander 400. The method further includes generating, by the at least one first vision device 600, first vision data based on the first view. The method further includes receiving, by at least one first wireless communication module 602 mounted to the first rotating structure 406, the first vision data. The method further including wirelessly transmitting, by the at least one first wireless communication module 602, the first vision data.

In certain embodiments, the method further includes capturing, by at least one second vision device 600, a second view of at least a portion of a subunit package 416 of at least one of a second set of payoff units 408 of a second rotating structure 406 of a strander 400 while a subunit reel 418 of the subunit package 416 of the at least one of the second set of payoff units 408 rotates relative to a cradle 414 of one of the second set of payoff units 408 mounted to a second chassis 410, and the second chassis 410 rotates around a center axis defined by a central axle 412 of the strander 400. The method further includes generating, by the at least one second vision device 600, second vision data based on the second view. The method further includes receiving, by at least one second wireless communication module 602 mounted to the second rotating structure 406, the second vision data. The method further includes wirelessly transmitting, by the at least one second wireless communication module 602, the second vision data.

In certain embodiments, the method further includes receiving, by at least one image processor 606, the first vision data. In certain embodiments, the method further includes processing, by the at least one image processor 606, the first vision data. In certain embodiments, the method further includes transmitting, by the at least one image processor 606, the first vision data to an image analysis module 608. In certain embodiments, the method further includes processing, by an image analysis module 608, the first vision data to identify payout hazards. In certain embodiments, the method further includes transmitting, by the image analysis module 608, an alarm signal to a line control module 610. In certain embodiments, the method further includes stopping or slowing, by the line control module 610, the strander 400 based on the alarm signal.

Although a stranding system for subunits is disclosed herein, it is noted that the features discussed above may be applied to other stranding systems using any type of subunits (e.g., optical subunits, wires, cables, etc.). Accordingly, in certain embodiments, a subunit can be any elongate subcomponent forming a part of a stranded component.

Although a stranding system is disclosed herein, it is noted that the features discussed above may be applied to other rotating structures. In particular, in certain embodiments, a control system includes a rotating structure including a primary unit configured to rotate around a center axis and a plurality of secondary units mounted to the primary unit. The control system further includes at least one vision device mounted to the rotating structure, the at least one vision device configured to capture a view of at least a portion of at least one of the plurality of secondary units to generate vision data. The control system further includes at least one wireless communication module mounted to the rotating structure. The at least one wireless communication module is configured to receive and wirelessly transmit the vision data. In certain embodiments, each secondary unit is rotatably mounted to the primary unit and configured to rotate relative to the primary unit.

It will be apparent to those skilled in the art that various modifications and variations can be made without departing from the spirit or scope of the invention.

Further, as used herein, it is intended that terms "fiber optic cables" and/or "optical fibers" include all types of single-mode and multi-mode light waveguides, including one or more optical fibers that may be upcoated, colored, buffered, ribbonized, and/or have other organizing or protective structure in a cable such as one or more tubes, strength members, jackets or the like. Likewise, other types of suitable optical fibers include bend-insensitive optical fibers or any other expedient of a medium for transmitting light signals. An example of a bend-insensitive, or bend resistant, optical fiber is ClearCurve® Multimode fiber, commercially available from Corning Incorporated. Suitable fibers of this type are disclosed, for example, in U.S. Patent Application Publication Nos. 2008/0166094 and 2009/0169163.

Many modifications and other embodiments of the concepts in this disclosure will come to mind to one skilled in the art to which the embodiments pertain, having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A stranding system, comprising:
    a first strander comprising;
        a first rotating structure comprising:
            a first chassis mounted to a central axle and configured to rotate around a center axis defined by the central axle;
            a first set of payoff units mounted to the first chassis, each payoff unit of the first set of payoff units comprising:
                a cradle mounted to the first chassis;
                a subunit package rotatably mounted to the cradle, comprising:
                    a subunit reel configured to rotate relative to the cradle;
                    a subunit wrapped around the subunit reel;
        at least one first vision device mounted to the first rotating structure, the at least one first vision device configured to capture a first view of at least a portion of the subunit package of at least one of the first set of payoff units to generate first vision data;
        at least one first wireless communication module mounted to the first rotating structure, the at least one wireless communication module configured to receive and wirelessly transmit the first vision data.

2. The stranding system of claim 1, wherein the cradle is rotatably mounted to the first chassis and configured to rotate relative to the first chassis.

3. The stranding system of claim 1, wherein the at least one first vision device is mounted to the first chassis.

4. The stranding system of claim 1, wherein the at least one first vision device is mounted to the cradle of one of the first set of payoff units.

5. The stranding system of claim 1, wherein the at least one first vision device comprises a plurality of first vision devices, each of the plurality of first vision devices mounted to a respective one of the first set of payoff units.

6. The stranding system of claim 1,
    wherein each payoff unit of the first set of payoff units includes a dancer arm configured to measure tension of the subunit;
    wherein the at least one first vision device is configured to capture the first view of the subunit package and at least a portion of the dancer arm.

7. The stranding system of claim 1, wherein the at least one first wireless communication module is configured to wirelessly transmit the first vision data at a rate of at least 1 Gb/s.

8. The stranding system of claim 1, further comprising at least one image processor configured to receive and process the first vision data.

9. The stranding system of claim 8, wherein the at least one vision device comprises the at least one image processor.

10. The stranding system of claim 8, wherein the at least one image processor is at least one of:
    mounted to the at least one vision device;
    mounted to the cradle of one of the first set of payoff units;
    mounted to the first chassis and in wireless communication with the at least one first vision device;
    mounted to the first chassis and in wireless communication with the at least one first vision device and a wireless access point remote from the first strander; or
    mounted remotely from the first strander and in wireless communication with the at least one first vision device via a wireless access point.

11. The stranding system of claim 1, further comprising an image analysis module configured to process the first vision data to identify payout hazards.

12. The stranding system of claim 11, wherein the image analysis module processes the first vision data to recognize patterns in wrapping of the subunit on the subunit reel corresponding to payout hazards.

13. The stranding system of claim 11, further comprising a line control module in communication with the at least one vision device via a wireless access point, the line control module configured to control operation of the strander.

14. The stranding system of claim 13,
    wherein the image analysis module is configured to generate an alarm signal upon identification of a payout hazard;
    wherein the line control module is configured to slow or stop operation of the strander upon receipt of the alarm signal.

15. The stranding system of claim 1,
    further comprising at least one second vision device and at least one second wireless communication module;
    wherein the first strander further comprises:
        a second rotating structure comprising:
            a second chassis mounted to the central axle and configured to rotate around the center axis;
            a second set of payoff units mounted to the second chassis, each payoff unit of the second set of payoff units comprising:
                a cradle rotatably mounted to the second chassis and configured to rotate relative to the second chassis;
                a subunit package rotatably mounted to the cradle, comprising:
                    a subunit reel configured to rotate relative to the cradle;
                    a subunit wrapped around the subunit reel;
    wherein the at least one second vision device is mounted to the second rotating structure, the at least one second vision device configured to capture a second view of at least a portion of the subunit package of at least one of the second set of payoff units to generate second vision data;
    wherein the at least one second wireless communication module is mounted to the second rotating structure, the at least one second wireless communication module configured to receive and wirelessly transmit the second vision data.

16. The stranding system of claim 1, further comprising a second strander in tandem with the first strander and configured to receive an output from the first strander, the second strander comprising:
a first rotating structure comprising:
a first chassis mounted to a central axle and configured to rotate around a center axis defined by the central axle;
a first set of payoff units mounted to the first chassis, each payoff unit of the first set of payoff units comprising:
a cradle mounted to the first chassis;
a subunit package rotatably mounted to the cradle, comprising:
a subunit reel configured to rotate relative to the cradle;
a subunit wrapped around the subunit reel;
at least one first vision device mounted to the first rotating structure, the at least one first vision device configured to capture a first view of at least a portion of the subunit package of at least one of the first set of payoff units to generate first vision data;
at least one first wireless communication module mounted to the first rotating structure, the at least one wireless communication module configured to receive and wirelessly transmit the first vision data.

17. The stranding system of claim 1, wherein each of the first set of payoff units comprises fiducial markers to aid at least one of an image processor or an image analysis module.

18. A method, comprising:
capturing, by at least one first vision device, a first view of at least a portion of a subunit package of at least one of a first set of payoff units of a first rotating structure of a first strander while:
a subunit reel of the subunit package of the at least one of the first set of payoff units rotates relative to a cradle of one of the first set of payoff units mounted to a first chassis;
the first chassis rotates around a center axis defined by a central axle of the first strander;
generating, by the at least one first vision device, first vision data based on the first view;
receiving, by at least one first wireless communication module mounted to the first rotating structure, the first vision data;
wirelessly transmitting, by the at least one first wireless communication module, the first vision data.

19. The method of claim 18, further comprising:
capturing, by at least one second vision device, a second view of at least a portion of a subunit package of at least one of a second set of payoff units of a second rotating structure of a first strander while:
a subunit reel of the subunit package of the at least one of the second set of payoff units rotates relative to a cradle of one of the second set of payoff units mounted to a second chassis;
the second chassis rotates around a center axis defined by a central axle of the first strander;
generating, by the at least one second vision device, second vision data based on the second view;
receiving, by at least one second wireless communication module mounted to the second rotating structure, the second vision data;
wirelessly transmitting, by the at least one second wireless communication module, the second vision data.

20. The method of claim 18, further comprising:
capturing, by at least one first vision device, a first view of at least a portion of a subunit package of at least one of a first set of payoff units of a first rotating structure of a second strander while:
a subunit reel of the subunit package of the at least one of the first set of payoff units rotates relative to a cradle of one of the first set of payoff units;
the first chassis rotates around a center axis defined by a central axle of the first strander;
generating, by the at least one first vision device, first vision data based on the first view;
receiving, by at least one first wireless communication module mounted to the first rotating structure, the first vision data;
wirelessly transmitting, by the at least one first wireless communication module, the first vision data.

21. The method of claim 18, further comprising:
wherein wirelessly transmitting the first vision data comprises wirelessly transmitting the first vision data at a rate of at least 1 Gb/s;
further comprising:
receiving, by at least one image processor, the first vision data;
processing, by the at least one image processor, the first vision data;
transmitting, by the at least one image processor, the first vision data to an image analysis module;
processing, by an image analysis module, the first vision data to identify payout hazards;
transmitting, by the image analysis module, an alarm signal to a line control module;
slowing or stopping, by the line control module, the first strander based on the alarm signal.

22. A system, comprising:
a rotating structure comprising:
a primary unit configured to rotate around a center axis;
at least one secondary unit mounted to the primary unit;
at least one vision device mounted to the rotating structure, the at least one vision device configured to capture a view of at least a portion of the at least one secondary unit to generate vision data;
at least one wireless communication module mounted to the rotating structure, the at least one wireless communication module configured to receive and wirelessly transmit the vision data.

23. The system of claim 22, wherein the at least one secondary unit is rotatably mounted to the primary unit and configured to rotate relative to the primary unit.

* * * * *